United States Patent
Deep et al.

(10) Patent No.: US 7,678,235 B2
(45) Date of Patent: Mar. 16, 2010

(54) WATER PURIFICATION SYSTEM

(75) Inventors: Richard J. Deep, Sunnyvale, CA (US);
Eugene Thiers, San Mateo, CA (US);
Douglas Michael Thom, Woodside, CA (US)

(73) Assignee: Sylvan Source, Inc., San Carlos, CA (US)

( * ) Notice: Subject to any disclaimer, the term of this patent is extended or adjusted under 35 U.S.C. 154(b) by 957 days.

(21) Appl. No.: 11/255,083

(22) Filed: Oct. 19, 2005

(65) Prior Publication Data
US 2007/0084713 A1    Apr. 19, 2007

(51) Int. Cl.
*B01D 3/42*     (2006.01)
*C02F 1/04*     (2006.01)
*C02F 1/20*     (2006.01)

(52) U.S. Cl. .................. 202/160; 96/156; 96/188; 159/44; 159/DIG. 2; 202/176; 202/197; 202/185.2; 210/87; 210/90; 210/11

(58) Field of Classification Search ............... 159/44, 159/DIG. 2; 202/160, 176, 197, 185.2, 185.5, 202/185.6, 189; 203/1, 2, 10, 40; 210/87, 210/90, 144; 96/156, 188
See application file for complete search history.

(56) References Cited

U.S. PATENT DOCUMENTS

| | | | | |
|---|---|---|---|---|
| 3,350,279 | A | * | 10/1967 | Hyman .................. 202/83 |
| 3,646,906 | A | | 3/1972 | Hammer |
| 3,805,880 | A | | 4/1974 | Lawlar |
| 3,860,492 | A | | 1/1975 | Lowi et al. |
| 3,907,683 | A | * | 9/1975 | Gilmont ................. 202/177 |
| 3,925,176 | A | | 12/1975 | Okert |
| 3,935,077 | A | * | 1/1976 | Dennison ................ 202/83 |
| 3,980,526 | A | | 9/1976 | Kirschmann |
| 4,081,331 | A | * | 3/1978 | Weiss .................... 202/181 |
| 4,089,662 | A | | 5/1978 | Williams |
| 4,110,170 | A | | 8/1978 | Kirschman et al. |
| 4,198,954 | A | | 4/1980 | Meijer |
| 4,234,391 | A | | 11/1980 | Seader |
| 4,336,825 | A | | 6/1982 | Pion |
| 4,342,623 | A | * | 8/1982 | Loeffler ................. 202/83 |
| 4,415,075 | A | | 11/1983 | McNesky et al. |
| 4,657,639 | A | * | 4/1987 | Mahadevan et al. ...... 202/182 |
| 4,698,136 | A | * | 10/1987 | El-Allawy .............. 203/11 |

(Continued)

FOREIGN PATENT DOCUMENTS

CH        671832        9/1989

(Continued)

OTHER PUBLICATIONS

U.S. Appl. No. 60/697,104, filed Jul. 6, 2005, Thiers.

(Continued)

*Primary Examiner*—Virginia Manoharan
(74) *Attorney, Agent, or Firm*—Davis Wright Tremaine LLP

(57) ABSTRACT

Embodiments of the invention provide systems and methods for water purification. The systems have a preheater, a degasser, an evaporation chamber, a demister, and a control system, wherein the control system permits operation of the purification system through repeated cycles without requiring user intervention or cleaning. The system is capable of removing, from a contaminated water sample, a plurality of contaminant types including: microbiological contaminants, radiological contaminants, metals, salts, volatile organics, and non-volatile organics.

74 Claims, 8 Drawing Sheets

U.S. PATENT DOCUMENTS

| | | | |
|---|---|---|---|
| 4,818,344 A * | 4/1989 | Glucksman | 202/176 |
| 4,938,868 A | 7/1990 | Nelson | |
| 4,943,353 A | 7/1990 | Shannon | |
| 5,021,128 A | 6/1991 | Palmer | |
| 5,059,287 A | 10/1991 | Harkey, Sr. | |
| 5,074,998 A | 12/1991 | De Baat Doelman | |
| 5,211,851 A | 5/1993 | Meurer | |
| 5,232,085 A | 8/1993 | Hayashi et al. | |
| 5,286,350 A | 2/1994 | Huang | |
| 5,286,351 A | 2/1994 | Salmon | |
| 5,300,197 A | 4/1994 | Mitani et al. | |
| 5,348,623 A | 9/1994 | Salmon | |
| 5,355,840 A | 10/1994 | Violi | |
| 5,365,920 A | 11/1994 | Lechner | |
| 5,368,698 A * | 11/1994 | Field et al. | 202/180 |
| 5,435,891 A | 7/1995 | Snitchler | |
| 5,441,606 A | 8/1995 | Schlesinger et al. | |
| 5,484,510 A | 1/1996 | Hartman et al. | |
| 5,512,142 A | 4/1996 | Hoiss | |
| 5,522,970 A | 6/1996 | Shimizu et al. | |
| 5,536,375 A | 7/1996 | Vogelman | |
| 5,575,923 A | 11/1996 | Solomon et al. | |
| 5,587,055 A | 12/1996 | Hartman et al. | |
| 5,609,732 A | 3/1997 | Magidson | |
| 5,614,066 A | 3/1997 | Williamson | |
| 5,729,987 A | 3/1998 | Miller | |
| 5,810,895 A | 9/1998 | Staehle et al. | |
| 5,833,812 A | 11/1998 | Hartman | |
| 5,932,074 A | 8/1999 | Hoiss | |
| 5,968,321 A | 10/1999 | Sears | |
| 5,976,387 A | 11/1999 | Higo et al. | |
| 6,009,238 A | 12/1999 | Belongia | |
| 6,030,504 A | 2/2000 | Belongia et al. | |
| 6,113,744 A | 9/2000 | Munro | |
| 6,113,860 A * | 9/2000 | Manninen | 422/103 |
| 6,117,275 A | 9/2000 | Baumann | |
| 6,290,891 B1 | 9/2001 | Galt | |
| 6,294,054 B1 | 9/2001 | Sutter | |
| 6,358,371 B1 | 3/2002 | Belongia et al. | |
| 6,365,005 B1 | 4/2002 | Schleiffarth | |
| 6,406,597 B1 | 6/2002 | Wang | |
| 6,423,187 B1 | 7/2002 | Zebuhr | |
| 6,428,656 B1 | 8/2002 | Bleth et al. | |
| 6,436,242 B1 | 8/2002 | Sanchez et al. | |
| 6,506,284 B1 | 1/2003 | Miyasaka | |
| 6,530,307 B2 | 3/2003 | Cusenza et al. | |
| 6,582,563 B1 | 6/2003 | Adam et al. | |
| 6,663,770 B2 | 12/2003 | Sears | |
| 6,689,251 B2 | 2/2004 | Zebuhr | |
| 6,744,978 B2 | 6/2004 | Tweedy et al. | |
| 6,830,661 B1 | 12/2004 | Land | |
| 6,881,231 B2 | 4/2005 | Acton et al. | |
| 7,465,376 B2 * | 12/2008 | Neubert et al. | 203/1 |
| 2002/0074275 A1 | 6/2002 | Sears | |
| 2004/0103786 A1 | 6/2004 | Hiltunen et al. | |
| 2007/0012556 A1* | 1/2007 | Lum et al. | 203/10 |
| 2007/0017192 A1 | 1/2007 | Bednarek et al. | |
| 2007/0068791 A1* | 3/2007 | Thom et al. | 203/2 |
| 2009/0101490 A1* | 4/2009 | Thiers | 202/166 |

FOREIGN PATENT DOCUMENTS

| | | |
|---|---|---|
| EP | 1258524 | 11/2002 |
| GB | 2022428 | 12/1972 |
| GB | 1384390 | 2/1975 |
| JP | 54066378 | 5/1979 |
| JP | 03000182 | 1/1991 |
| JP | 2002-22102 | 1/2002 |
| WO | WO 93/18834 | 9/1993 |
| WO | WO 99/30797 | 6/1999 |
| WO | WO 2005/056153 A1 | 6/2005 |
| WO | WO 2005/056154 A1 | 6/2005 |
| WO | PCT/US2006/025994 | 6/2006 |
| WO | WO 2006/118912 | 11/2006 |
| WO | WO 2007/008491 | 1/2007 |
| WO | WO 2007/047443 | 4/2007 |
| WO | WO 2007/047674 | 4/2007 |
| WO | WO 2007/103117 | 9/2007 |
| WO | WO 2008/115578 | 9/2007 |

OTHER PUBLICATIONS

U.S. Appl. No. 60/697,106, filed Jul. 6, 2005, Thiers.
U.S. Appl. No. 60/697,107, filed Jul. 6, 2005, Lum et al.
U.S. Appl. No. 11/444,911, filed May 31, 2006, Thom et al.
U.S. Appl. No. 11/444,912, filed May 31, 2006, Lum et al.
U.S. Appl. No. 60/778,680, filed Mar. 3, 2006, Thiers.
U.S. Appl. No. 60/779,201, filed Mar. 30, 2006, Deep et al.
U.S. Appl. No. 60/727,106, filed Oct. 14, 2005, Demmons et al.
U.S. Appl. No. 60/748,496, filed Dec. 7, 2005, Demmons et al.
Williams, R., "The Geometrical Foundation of Natural Structure: A Sourcebook of Design," New York, Dover (1979).
Office Action issued in Chinese Application No. 200680024811.9, 6 pages (dated Sep. 25, 2009).
Supplemental Search Report for European Application No. 04812499.4, 5 pages (dated Feb. 11, 2008).
Office Action issued in European Application No. 04812499.4, 4 pages (dated Jul. 8, 2009).
Office Action issued in Mexican Application No. PA/a/2006/006229, 3 pages (dated Aug. 26, 2008).
Supplemental Search Report for European Application No. 04812500.9, 3 pages (dated Jun. 5, 2007).
Office Action issued in EP Application No. 04812500.9, 5 pages (dated Nov. 23, 2007).
Office Action issued in Mexican Application No. PA/a/2006/006227, 3 pages (dated Aug. 18, 2008).
Office Action issued in U.S. Appl. No. 11/444,912, 16 pages (dated May 29, 2009).
International Search Report and the Written Opinion of the International Searching Authority, 9 pages in International Application No. PCT/US06/15859 (dated Jun. 5, 2007).
International Search Report and the Written Opinion of the International Searching Authority, 8 pages in International Application No. PCT/US06/25994 (dated Mar. 15, 2007).
International Search Report and the Written Opinion of the International Searching Authority, 5 pages in 47 International Application No. PCT/US04/39991 (dated Apr. 19, 2005).
International Search Report and the Written Opinion of the International Searching Authority, 1 page in International Application No. PCT/US04/39993 (dated Apr. 18, 2005).
International Search Report and the Written Opinion of the International Searching Authority,9 pages in International Application No. PCT/US06/40103 (dated Aug. 27, 2007).
International Search Report and the Written Opinion of the International Searching Authority, 7 pages in International Application No. PCT/US06/040553 (dated Feb. 4, 2007).
International Search Report and the Written Opinion of the International Searching Authority, 7 pages in International Application No. PCT/US07/005270 (dated Sep. 2, 2007).
International Search Report and the Written Opinion of the International Searching Authority, 7 pages in international Application No. PCT/US08/03744 (dated Jun. 25, 2008).
Response to Office Action for Mexican Application No. PA/a/2006/006229, 3 pages (Jan. 8, 2009).
Response to Office Action for European Application No. 04812500.9, 15 pages (dated Jun. 7, 2008).
Response to Office Action for Mexican Application No. PA/a/2006/006227, 3 pages (dated Jan. 7, 2009).
Response to Office ActiOn for U.S. Appl. No. 11/444,912, 11 pages (dated Oct. 29, 2009).

* cited by examiner

Section A-A

WATER PURIFICATION SYSTEM

FIELD OF THE INVENTION

This invention relates to the field of water purification. In particular, embodiments of the invention relate to systems and methods of removing essentially all of a broad spectrum of impurities from water in an automated process that requires neither cleaning nor user intervention during the course of several months to several years, with relatively high yields of product water per unit of input water.

BACKGROUND

Water purification technology is rapidly becoming an essential aspect of modern life as conventional water resources become increasingly scarce, municipal distribution systems for potable water deteriorate with age, and increased water usage depletes wells and reservoirs, causing saline water contamination. Additionally, further contamination of water sources is occurring from a variety of activities, which include, for example, intensive agriculture, gasoline additives, and heavy toxic metals. These issues are leading to increasing and objectionable levels of germs, bacteria, salts, MTBE, chlorates, perchlorates, arsenic, mercury, and even the chemicals used to disinfect potable water, in the water system.

Conventional technologies, such as reverse osmosis (RO), filtration, and chemical treatment are rarely able to handle the diverse range of water contaminants. Additionally, even though they are commercially available, they often require multiple treatment stages or combination of various technologies to achieve acceptable water quality. Less conventional technologies, such as ultraviolet (UV) light irradiation or ozone treatment, can be effective against viruses and bacteria, but seldom remove other contaminants, such as dissolved gases, salts, hydrocarbons, and insoluble solids. Additionally, most distillation technologies, while they may be superior at removing a subset of contaminants are frequently unable to handle all types of contaminants.

Accordingly, sophisticated distillation systems that are continuous, self-cleaning, and recover a major fraction of the input water appear as the best long-term option to resolve increasing water contamination problems and water scarcity.

SUMMARY

Embodiments of the present invention provide an improved water purification system. The water purification system can include an inlet, a preheater, a degasser, an evaporation chamber, a demister, a product condenser, a waste outlet, a product outlet, and a control system. The control system permits operation of the purification system through repeated cycles without requiring user intervention or cleaning. The system is capable of removing, from a contaminated water sample, a plurality of contaminant types including microbiological contaminants, radiological contaminants, metals, salts, volatile organics, and non-volatile organics; such that water purified in the system has levels of all contaminant types below the levels shown in Tables 1, 2, or 3 when the contaminated water has levels of the contaminant types that are up to 25 times greater than the levels shown in Table 1, 2, or 3. In embodiments of the system, the volume of water produced can be between about 20% and about 95% of a volume of input water. The system does not require cleaning through at least about two months, six months, one year of use, or more.

The system can also include an inlet switch to regulate flow of water through the inlet. The switch can include a mechanism that can be, for example, a solenoid, a valve, an aperture, and the like. The inlet switch can be controlled by the control system. Also, the system can further include a shutdown control. The shutdown control can be, for example, a manual control, a flood control, a tank capacity control, an evaporation chamber capacity control, and the like. The control system can control the inlet based upon feedback from an evaporation chamber, and/or a tank float. The control system can control the switch based upon feedback from the purification system. The feedback can be based upon, for example, amount of water in a product water container, flow of product water through the product outlet, time of water flow, time of no water flow, amount of water in the evaporation chamber, detection of a leak, evaporation chamber pressure, output water quality (total dissolved solids) pressure differential across evaporation chamber, evaporation chamber overflow weir float, and the like. The system can also include a flow controller. The flow controller can include a pressure regulator. The pressure regulator can maintain water pressure between about 0 kPa and 250 kPa. (0 to 36 psi). The flow controller can maintain water flow at a rate of between 10 and 75 ml/min. The system can include a sediment trap.

Also, the system can have a preheat tube pass through the evaporation chamber. Water exiting the preheat tube can have a temperature of at least about 96° C. The preheat tube can permit residence time of water in the preheat tube of at least about 15 seconds. The preheat tube can include a coil. The coil can have substantially horizontal net flow, and water moving through the coil can pass repeatedly through a horizontal plane. The preheat tube can comprise heat exchange with a steam condenser. At least a portion of the preheat tube can be coaxial with at least a portion of the steam condenser. The steam condenser can contain waste steam.

The degasser can be in a substantially vertical orientation, having an upper end and a lower end. Heated water can exit the degasser proximate to the lower end. In the system, steam from the evaporation chamber can enter the degasser proximate to the lower end, but can also exit the degasser proximate to the upper end. The degasser can include a matrix adapted to facilitate mixing of water and steam. The matrix can include substantially spherical particles. However, the matrix can also include non-spherical particles. The matrix can include particles having a size selected to permit uniform packing within the degasser. The matrix can also include particles of distinct sizes, and the particles can be arranged in the degasser in a size gradient.

In the system, water can exit the degasser, substantially free of organics and volatile gases. The evaporation chamber can include at least an upper segment and a lower segment, and a horizontal section of the upper segment can have a greater area than a horizontal section of the lower segment. The evaporation chamber can include a junction between the upper segment and the lower segment. The junction can be substantially horizontal. The evaporation chamber can also include a drain, which can be at or above the junction. The evaporation chamber can also include a self cleaning medium including a plurality of particles, the drain having an opening, the opening having a size that does not permit the particles to pass through the drain, the opening further having a shape that is not complementary to a shape of the particles. The evaporation chamber can include a self cleaning medium for interfering with accumulation of precipitates at least in an area proximate to a heated region of the evaporation chamber. The medium can include a plurality a particles. The particles can be substantially spherical. The particles can also include a characteristic permitting substantially continuous agitation of the particles by boiling of water in the evaporation chamber. The characteristic can be, for example, specific gravity, size, morphology, population number, and the like. The particles can have a selected hardness, so that the hardness permits scouring of the evaporation chamber by the particles without substantially eroding the particles or the evaporation chamber. Furthermore, the particles can be composed of ceramic, metal, glass, or stone. The particles can have a specific gravity greater than about 1.0 and less than about 8.0, or more preferably, between about 2.0 and about 5.0. The evaporation chamber can also include a heating element adjacent a bottom portion of the evaporation chamber. The heating element can be positioned outside the evaporation chamber adjacent the bottom of the evaporation chamber, and the heating element can be bonded to the evaporation chamber. The heating element can also be positioned inside the evaporation chamber adjacent the bottom of the evaporation chamber.

The demister can be positioned proximate to an upper surface of the evaporation chamber. Steam from the evaporation chamber can enter the demister under pressure. The demister can include a pressure differential, and the pressure differential can be no less than 125 to about 2500 Pa. The demister can be adapted to separate clean steam from waste steam via cyclonic action. The ratio of clean steam to waste steam can be greater than about 10:1. The control system can adjust a parameter to regulate steam quality. Steam quality can include, for example, clean steam purity, ratio of clean steam to waste steam, and the like. The parameter can include at least one parameter such as a recess position of a clean steam outlet, a pressure differential across the demister, a resistance to flow of a steam inlet, a resistance to flow of a steam outlet, and the like. The system can also include a cooler for the product condenser, and the cooler can include a fan. The product condenser can include a coil. Product water can exit the product condenser through the product outlet. The system can also include a waste condenser. Waste water can exit the waste condenser through the waste outlet.

The system can also include a product water storage tank. The storage tank can include at least one control mechanism. The control mechanism can, for example, include a float, a conductivity meter, and the like. The control system can also include a delay such that upon initiation of a cycle, no steam is directed to the product outlet during a selected delay period. The delay period can be at least about 10 to 30 minutes. The control system can include an average residence time of water in the evaporation chamber of at least about 10 minutes. Alternatively, the control system can include an average residence time of water in the evaporation chamber of at least about 45 minutes. The control system can also include an evaporation chamber flush such that water in the evaporation chamber is rapidly drained to waste, permitting removal of accumulated impurities and precipitates from the evaporation chamber.

The evaporation chamber can be configured such that upon evaporation chamber flush, a residual volume of water remains in a lower portion of the evaporation chamber. The residual water of the system can provide initial steam to the degasser during initiation of a subsequent purification cycle. The invention also includes a method of purifying water. Such a method includes the steps of: providing a source of inlet water including at least one contaminant in a first concentration; passing the inlet water through a preheater under conditions capable of raising a temperature of the inlet water above 90° C.; stripping the inlet water of essentially all organics, volatiles, and gasses by counterflowing the inlet water against an opposite directional flow of a gas in a degasser; maintaining the water in an evaporation chamber for an average residence time of between 10 and 90 minutes under conditions permitting formation of steam; discharging steam from the evaporation chamber to a cyclone demister; separating clean steam from contaminant-containing waste in the demister such that yield of clean steam is at least about 4 times greater than yield of waste from the demister; condensing the clean steam to yield purified water, including the at least one contaminant in a second concentration, wherein the second concentration is lower than the first concentration. In this method, at least one contaminant includes, for example, a microorganism, a radionuclide, a salt, or an organic. The second concentration can be, for example, no more than the concentration shown in Tables 1, 2, or 3; the first concentration can be at least about 10 times the first concentration. However, the first concentration can be at least about 25-fold greater than the second concentration. The gas can be, for example, steam, air, nitrogen, and the like. The process steps in the method can be repeated automatically for at least about three months with no required cleaning or maintenance. However, the process steps can be repeated automatically for at least about one year with no required cleaning or maintenance.

DETAILED DESCRIPTION

Figure 1:
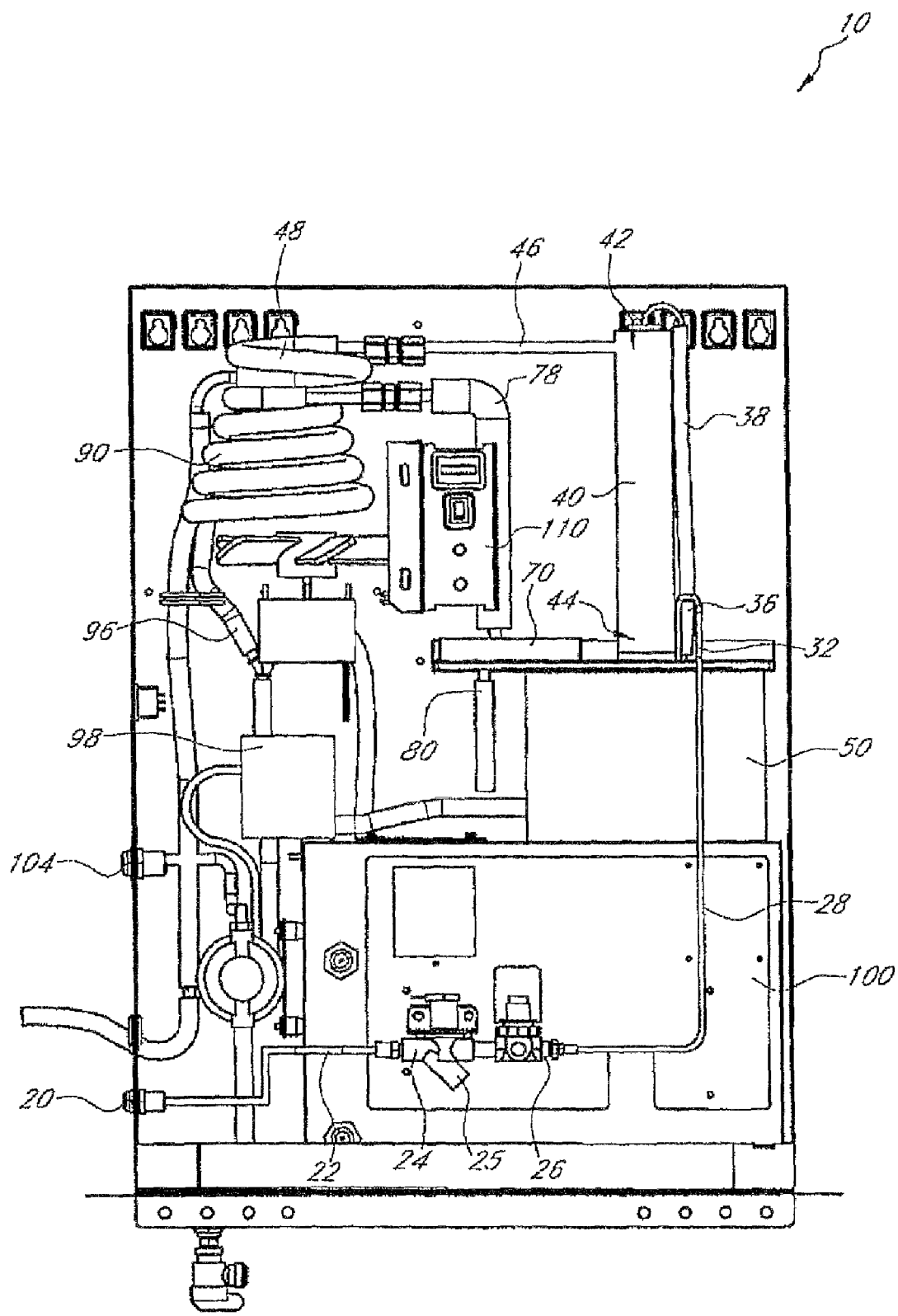
FIG. 1 is a front view of an embodiment of the water purification system.
Figure 2:
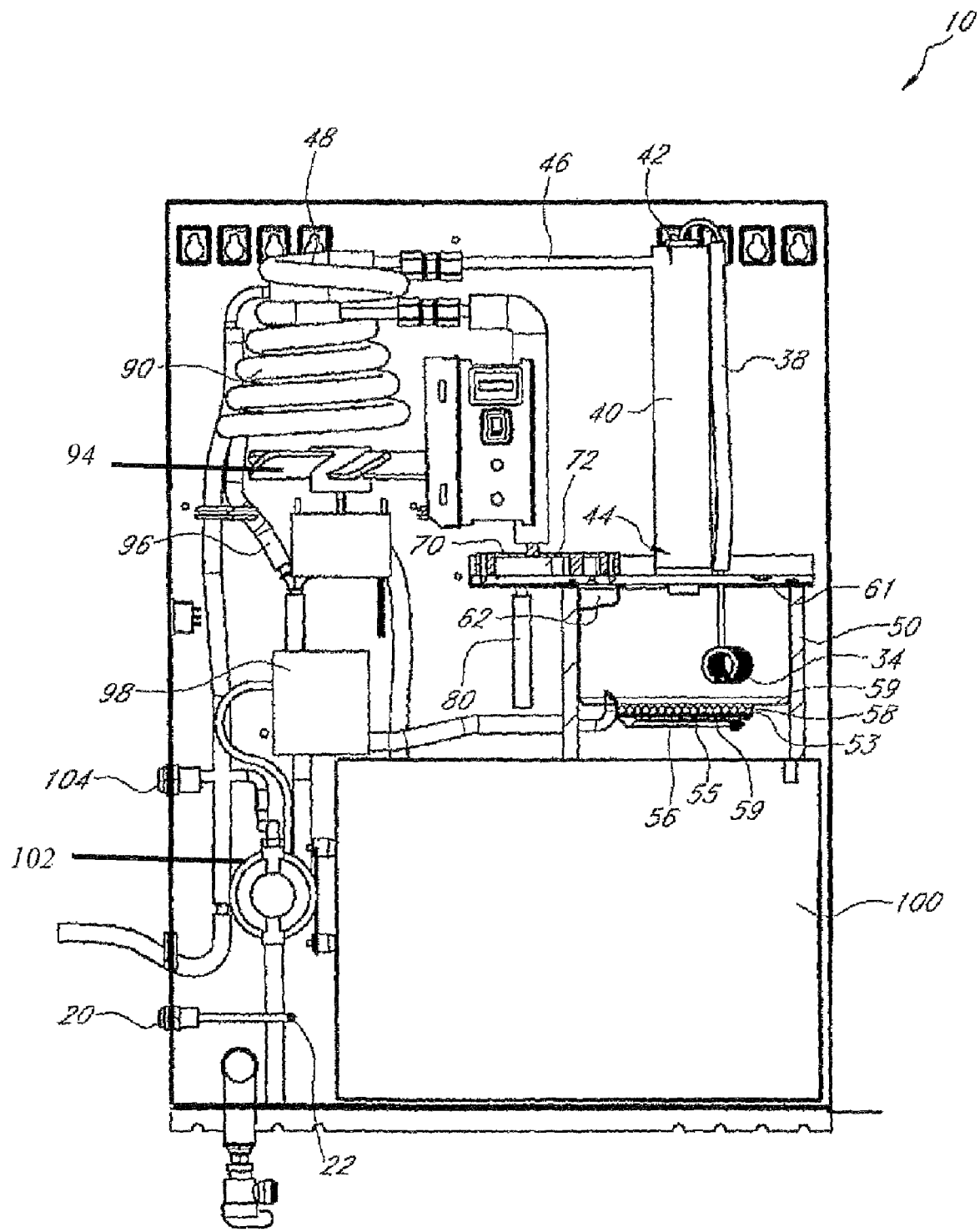
FIG. 2 is a sectional front view of an embodiment of the water purification system.
Figure 3:
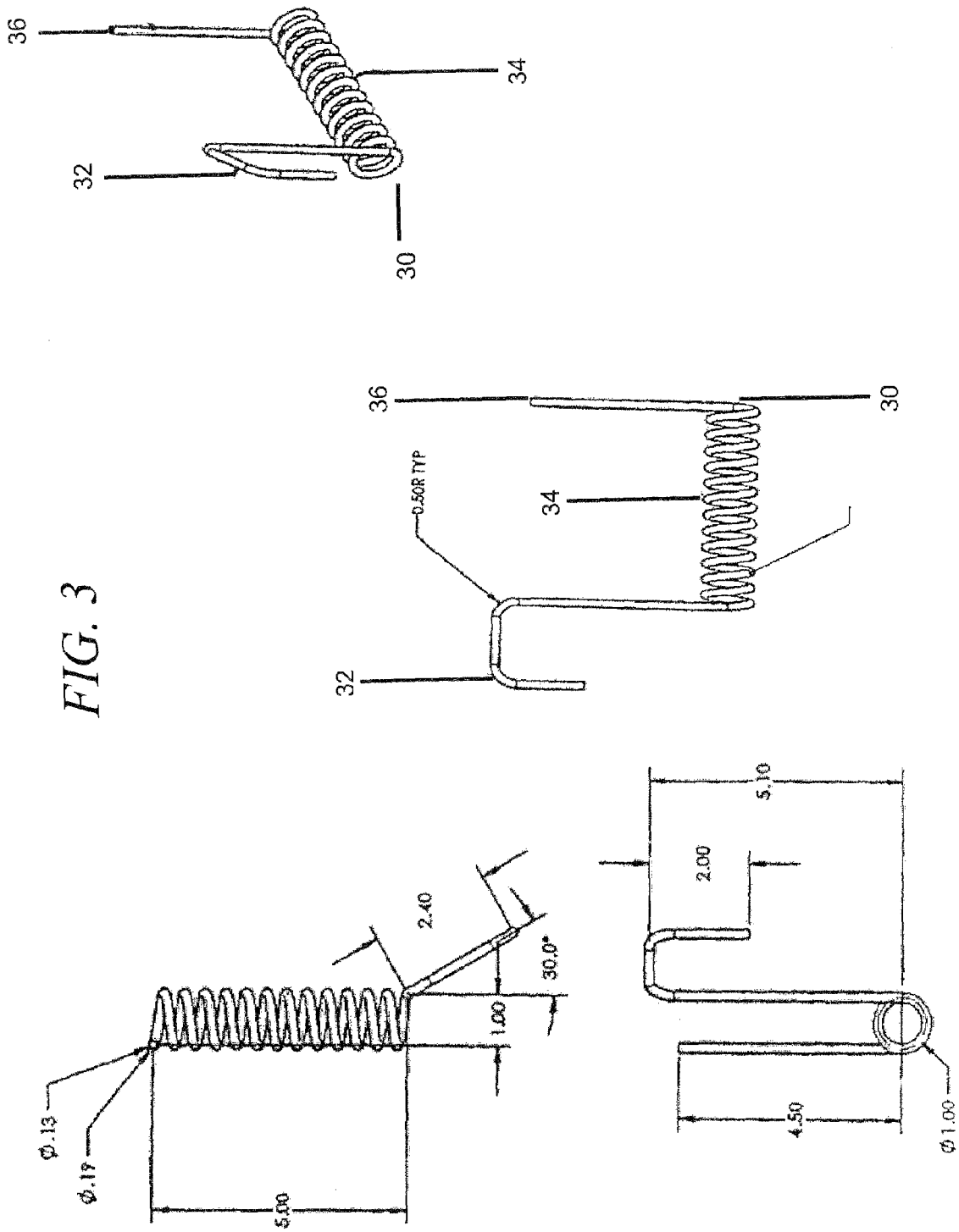
FIG. 3 is a diagram showing detail of the preheater.
Figure 4:
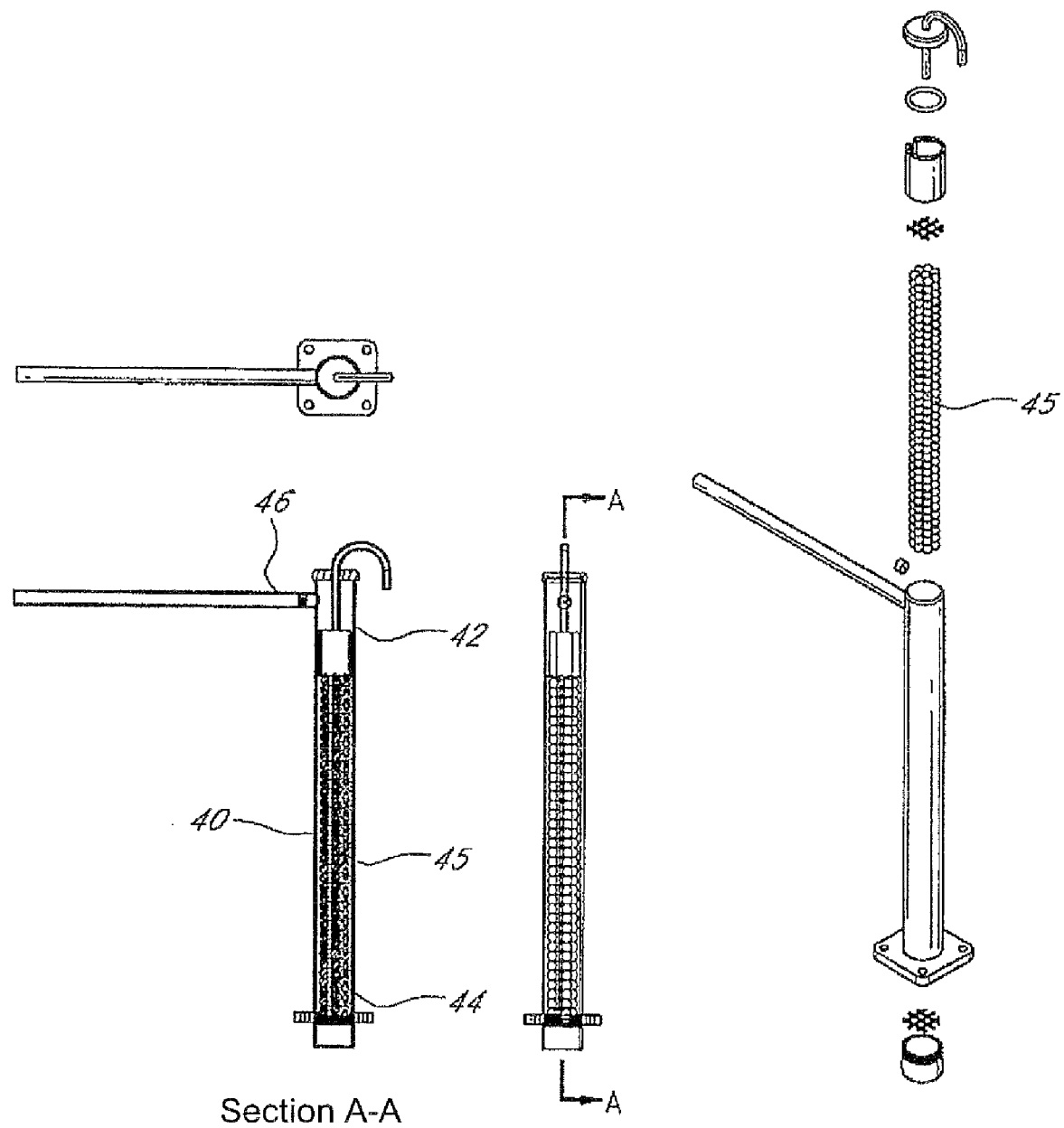
FIG. 4 is a diagram showing detail of the degasser.
Figure 5:
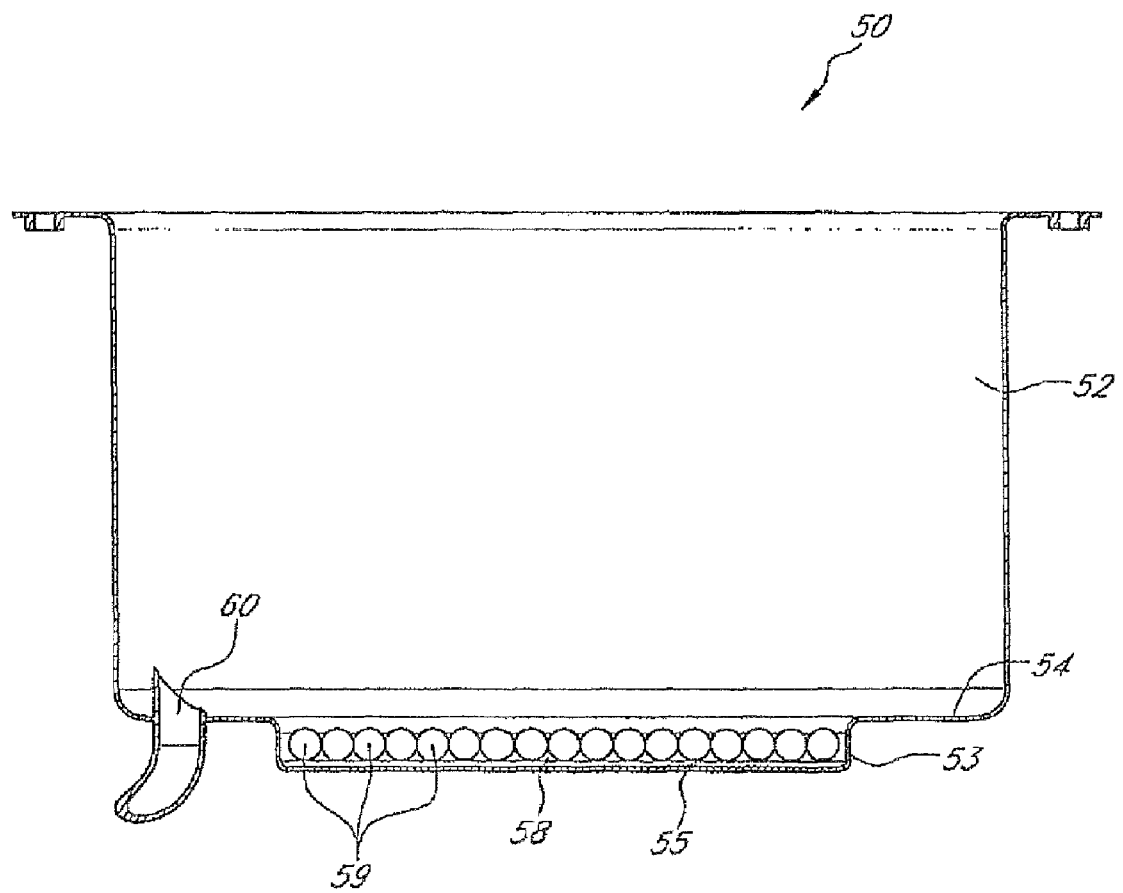
FIG. 5 is a diagram showing detail of the evaporation chamber.
Figure 6:
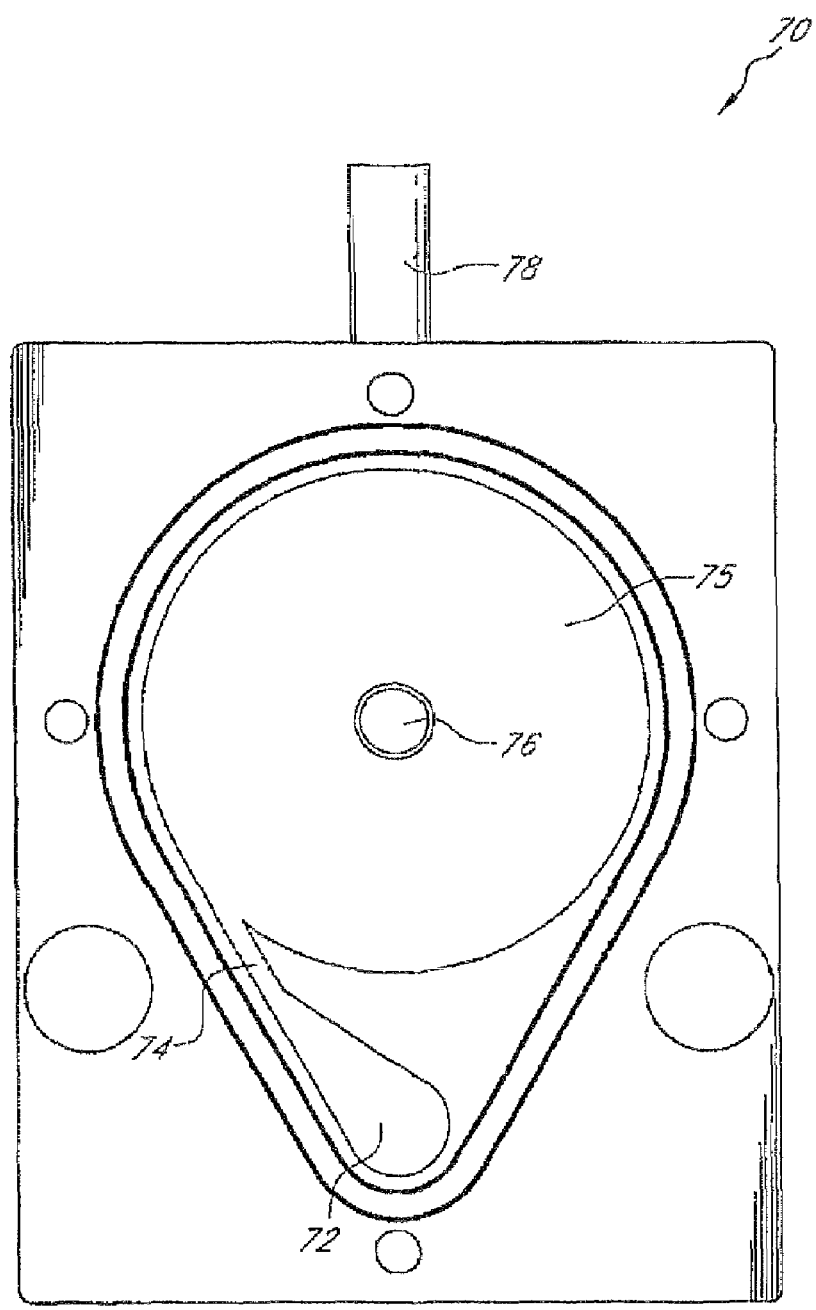
FIG. 6 is a diagram showing detail of the cyclone demister.

Embodiments of the invention are disclosed herein, in some cases in exemplary form or by reference to one or more Figures. However, any such disclosure of a particular embodiment is exemplary only, and is not indicative of the full scope of the invention.

Embodiments of the invention include systems, methods, and apparatus for water purification. Preferred embodiments provide broad spectrum water purification that is fully automated and that does not require cleaning or user intervention over very long periods of time. For example, systems disclosed herein can run without user control or intervention for 2, 4, 6, 8, 10, or 12 months, or longer. In preferred embodiments, the systems can run automatically for 1, 2, 3, 4, 5, 6, 7, 8, 9, 10, 11, 12, 13, 14, or 15 years, or more.

Embodiments of the invention thus provide a water purification system including at least an inlet, a preheater, a degasser, an evaporation chamber, a demister, a product condenser, a waste outlet, a product outlet, and a control system, wherein product water exiting the outlet is substantially pure, and wherein a volume of product water produced is at least about 10, 15, or 20% of a volume of input water, and wherein the control system permits operation of the purification system through repeated cycles without requiring user intervention. In preferred embodiments, the volume of product water produced is at least about 25, 30, 35, 40, 45, 50, 55, 60, 65, 70, 75, 80, 85, 90, 95, 96, 97, 98, or 99%, or more, of the volume of input water. Thus the system is of great benefit in conditions in which there is relatively high expense or inconvenience associated with obtaining inlet water and/or disposing of wastewater. The system is significantly more efficient in terms of its production of product water per unit of input water or wastewater, than many other systems.

Substantially pure water can be, in different embodiments, water that meets any of the following criteria: water purified to a purity, with respect to any contaminant, that is at least 25, 30, 35, 40, 45, 50, 55, 60, 65, 70, 75, 80, 85, 90, 95, 100, 125, 150, 175, 200, 250, 500, 750, 1000, or more, times greater purity than the inlet water. In other embodiments, substantially pure water is water that is purified to one of the foregoing levels, with respect to a plurality of contaminants present in the inlet water. That is, in these embodiments, water purity or quality is a function of the concentration of an array of one or more contaminants, and substantially pure water is water that has, for example, a 25-fold or greater ratio between the concentration of these contaminants in the inlet water as compared to the concentration of the same contaminants in the product water.

In other embodiments, water purity can be measured by conductivity, where ultrapure water has a conductivity typically less than about 1 μSiemens, and distilled water typically has a conductivity of about 5. In such embodiments, conductivity of the product water is generally between about 1 and 7, typically between about 2 and 6, preferably between about 2 and 5, 2 and 4, or 2 and 3. Conductivity is a measure of total dissolved solids (TDS) and is a good indicator of water purity with respect to salts, ions, minerals, and the like.

Alternatively, water purity can be measured by various standards such as, for example, current EPA standards as listed in Table 1 and Table 2, as well as other accepted standards as listed in Table 2. Accordingly, preferred embodiments of the invention are capable of reducing any of one or more contaminants from a broad range of contaminants, including for example any contaminant(s) listed in Table 1, wherein the final product water has a level for such contaminant(s) at or below the level specified in the column labeled "MCL" where the inlet water has a level for such contaminant(s) that is up to about 25-fold greater than the specified MCL. Likewise, in some embodiments and for some contaminants, systems of the invention can remove contaminants to MCL levels when the inlet water has a 30-, 40-, 50-, 60-, 70-, 80-, 90-, 100-, 150-, 250-, 500-, or 1000-fold or more; higher contamination than the MCL or the product water.

While the capacity of any system to remove contaminants from inlet water is to some extent a function of the total impurity levels in the inlet water, systems of the invention are particularly well suited to remove a plurality of different contaminants, of widely different types, from a single feed stream, producing water that is comparable to distilled water and is in some cases comparable to ultrapure water. It should be noted that the "Challenge Water" column in Table 1 contains concentration levels for contaminants in water used in EPA tests. Preferred embodiments of water purification systems of the invention typically can remove much greater amounts of initial contaminants than the amounts listed in this column. However, of course, contaminant levels corresponding to those mentioned in the "Challenge Water" column are likewise well within the scope of the capabilities of embodiments of the invention.

TABLE 1

|  | Units | Protocol | MCL | Challenge Water |
|---|---|---|---|---|
| Metals |  |  |  |  |
| Aluminum | Ppm |  | 0.2 | 0.6 |
| Antimony | Ppm |  | 0.006 | 0.1 |
| Arsenic | Ppm |  | 0.01 | 0.1 |
| Beryllium | Ppm |  | 0.004 | 0.1 |
| Boron | Ppb |  |  | 20 |
| Chromium | Ppm |  | 0.1 | 0.1 |
| Copper | Ppm |  | 1.3 | 1.3 |
| Iron | Ppm |  | 0.3 | 8 |
| Lead | Ppm |  | 0.015 | 0.1 |
| Manganese | ppm |  | 0.05 | 1 |
| Mercury | ppm |  | 0.002 | 0.1 |
| Molybdenum | ppm |  |  | 0.01 |
| Nickel | ppm |  |  | 0.02 |
| Silver | ppm |  | 0.1 | 0.2 |
| Thallium | ppm |  | 0.002 | 0.01 |
| Vanadium | ppm |  |  | 0.1 |
| Zinc | ppm |  | 5 | 5 |
| Subtotal of entire mix |  |  |  | 36.84 |
| Inorganic salts |  |  |  |  |
| Bromide | ppm |  |  | 0.5 |
| Chloride | ppm |  | 250 | 350 |
| Cyanide | ppm |  | 0.2 | 0.4 |
| Fluoride | ppm |  | 4 | 8 |
| Nitrate, as NO3 | ppm |  | 10 | 90 |
| Nitrite, as N2 | ppm |  | 1 | 2 |
| Sulfate | ppm |  | 250 | 350 |
| Subtotal of entire mix |  |  |  | 800.9 |

TABLE 1-continued

| | Units | Protocol | MCL | Challenge Water |
|---|---|---|---|---|
| Fourth Group: 2 Highly volatile VOCs + 2 non-volatiles | | | | |
| Heptachlor | ppm | EPA525.2 | 0.0004 | 0.04 |
| Tetrachloroethylene-PCE | ppm | EPA524.2 | 0.00006 | 0.02 |
| Epichlorohydrin | ppm | | 0.07 | 0.2 |
| Pentachlorophenol | ppm | EPA515.4 | 0.001 | 0.1 |
| Subtotal of entire mix | | | | 0.36 |
| Fifth Group: 2 Highly volatile VOCs + 2 non-volatiles | | | | |
| Carbon tetrachloride | ppm | EPA524.2 | 0.005 | 0.01 |
| m,p-Xylenes | ppm | EPA524.2 | 10 | 20 |
| Di(2-ethylhexyl) adipate | ppm | EPA525.2 | 0.4 | 0.8 |
| Trichloro acetic acid | ppm | SM6251B | 0.06 | 0.12 |
| Subtotal of entire mix | | | | 21.29 |
| Sixth Group: 3 Highly volatile VOCs + 3 non-volatiles | | | | |
| 1,1-dichloroethylene | ppm | | 0.007 | 0.15 |
| Ethylbenzene | ppm | EP524.2 | 0.7 | 1.5 |
| Aldrin | ppm | EPA505 | 0.005 | 0.1 |
| Dalapon (2,2,-Dichloropropionic acid) | ppm | EPA515.4 | 0.2 | 0.4 |
| Carbofuran (Furadan) | ppm | EPA531.2 | 0.04 | 0.1 |
| 2,4,5-TP (silvex) | ppm | EPA515.4 | 0.05 | 0.1 |
| Subtotal of entire mix | | | | 2.35 |
| Seventh Group: 3 Highly volatile VOCs + 3 non-volatiles | | | | |
| Trichloroethylene-TCE | ppm | EPA524.2 | 0.005 | 0.1 |
| Toluene | ppm | EPA524.2 | 1 | 2 |
| 1,2,4 Trichlorobenzene | ppm | EPA524.2 | 0.07 | 0.15 |
| 2,4-D | ppm | EPA515.4 | 0.07 | 0.15 |
| Alachlor (Alanex) | ppm | EPA 525.2 | 0.002 | 0.1 |
| Simazine | ppm | EPA525.2 | 0.004 | 0.1 |
| Subtotal of entire mix | | | | 2.6 |
| Eighth Group: 3 Highly volatile VOCs + 3 non-volatiles | | | | |
| Vinylchloride (chloroethene) | ppm | EPA524.2 | 0.002 | 0.1 |
| 1,2-dichlorobenzene (1,2 DCB) | ppm | EPA524.2 | 0.6 | 1 |
| Chlorobenzene | ppm | EPA524.2 | 0.1 | 0.2 |
| Atrazine | ppm | EPA 525.2 | 0.003 | 0.1 |
| Endothal | ppm | EPA548.1 | 0.01 | 0.2 |
| Oxamyl (Vydate) | ppm | EPA531.2 | 0.2 | 0.4 |
| Subtotal of entire mix | | | | 2 |
| Ninth Group: 3 Highly volatile VOCs + 3 non-volatiles | | | | |
| Styrene | ppm | EPA524.2 | 0.1 | 1 |
| Benzene | ppm | EPA524.2 | 0.005 | 0.2 |
| Methoxychlor | ppm | EPA 525.2/505 | 0.04 | 0.1 |
| Glyphosate | ppm | EPA547 | 0.7 | 1.5 |
| Pichloram | ppm | EPA515.4 | 0.5 | 1 |
| 1,3-dichlorobenzene (1,3 DCB) | ppm | EPA524.2 | 0.075 | 0.15 |
| Subtotal of entire mix | | | | 3.95 |
| Tenth Group: 3 Highly volatile VOCs + 3 non-volatiles | | | | |
| 1,2-dichloropropane (DCP) | ppm | EPA524.2 | 0.005 | 0.1 |
| Chloroform | ppm | EPA524.2 | 80 | 0.1 |
| Bromomethane (methyl bromide) | ppm | EPA524.2 | | 0.1 |
| PCB1242 Arochlor | ppb | EPA 505 | 0.5 | 1 |
| Chlordane | ppm | EPA 525.2/505 | 0.002 | 0.2 |
| MEK--Methylehtylketone(2-butanone) | ppb | EPA524.2 | | 0.2 |
| Subtotal of entire mix | | | | 1.7 |

TABLE 1-continued

| | Units | Protocol | MCL | Challenge Water |
|---|---|---|---|---|
| Eleventh Group: 4 volatile VOCs + 5 non-volatile PCBs | | | | |
| 2,4-DDE (dichlorodiphenyl dichloroethylene) | ppm | EPA525.2 | | 0.1 |
| Bromodichloromethane | ppb | EPA524.2 | 80 | 0.1 |
| 1,1,1-Trichloroethane (TCA) | ppm | EPA524.2 | 0.2 | 0.4 |
| Bromoform | ppm | EPA524.2 | 80 | 0.1 |
| PCB 1221 Arochlor | ppm | EPA 505 | 0.5 | 0.05 |
| PCB 1260 Arochlor | ppm | EPA 505 | 0.5 | 0.05 |
| PCB 1232 Arochlor | ppm | EPA 505 | 0.5 | 0.05 |
| PCB 1254 Arochlor | ppm | EPA 505 | 0.5 | 0.05 |
| PCB 1016 Arochlor | ppm | EPA 505 | 0.5 | 0.05 |
| Subtotal of entire mix | | | | 0.95 |
| Group No 12: 5 volatile VOCs + 5 non-volatile PCBs | | | | |
| dichloromethane (DCM) Methylenechloride | ppm | EPA524.2 | 0.005 | 0.1 |
| 1,2-dichloroethane | ppm | | 0.005 | 0.1 |
| Lindane (gamma BHC) | ppm | EPA525.2 | 0.0002 | 0.05 |
| Benzo(a) pyrene | ppm | EPA 525.2 | 0.0002 | 0.05 |
| Endrin | ppm | EPA 525.2/505 | 0.002 | 0.05 |
| 1,1,2-Trichloroethane (TCA) | ppm | EPA524.2 | 0.005 | 0.05 |
| MTBE | ppm | EPA524.2 | | 0.05 |
| Ethylene dibromide-EDB | ppm | EPA504.1 | 0.00005 | 0.05 |
| Dinoseb | ppm | EPA515.4 | 0.007 | 0.05 |
| Di(2-ethylhexyl) phthalate (DEHP) | ppm | EPA525.2 | 0.006 | 0.05 |
| Subtotal of entire mix | | | | 0.5 |
| Group No 13: Balance of 6 VOCs | | | | |
| Chloromethane (methyl chloride) | ppm | EPA524.2 | | 0.1 |
| Toxaphene | ppm | EPA 505 | 0.003 | 0.1 |
| trans-1,2-dichloroethylene | ppm | EPA524.2 | 0.1 | 0.2 |
| Dibromochloromethane | ppm | EPA524.2 | 80 | 0.05 |
| cis-1,2-dichloroethylene | ppm | EPA524.2 | 0.07 | 0.05 |
| 1,2-Dibromo-3-Chloro propane | ppm | EPA 504.1 | 0.0002 | 0.05 |
| Subtotal of entire mix | | | | 0.55 |

Determination of water purity and/or efficiency of purification performance can be based upon the ability of a system to remove a broad range of contaminants. For many biological contaminants, the objective is to remove substantially all live contaminants. Table 2 lists additional common contaminants of source water and standard protocols for testing levels of the contaminants. The protocols listed in Tables 1 and 2, are publicly available at hypertext transfer protocol www.epa.gov/safewater/mcl.html #mcls for common water contaminants; Methods for the Determination of Organic Compounds in Drinking Water, EPA/600/4-88-039, December 1988, Revised, July 1991. Methods 547, 550 and 550.1 are in Methods for the Determination of Organic Compounds in Drinking Water—Supplement I, EPA/600-4-90-020, July 1990. Methods 548.1, 549.1, 552.1 and 555 are in Methods for the Determination of Organic Compounds in Drinking Water—Supplement II, EPA/600/R-92-129, August 1992. Methods 502.2, 504.1, 505, 506, 507, 508, 508.1, 515.2, 524.2 525.2, 531.1, 551.1 and 552.2 are in Methods for the Determination of Organic Compounds in Drinking Water—Supplement III, EPA/600/R-95-131, August 1995. Method 1613 is titled "Tetra-through OctaChlorinated Dioxins and Furans by Isotope-Dilution HRGC/HRMS", EPA/821-B-94-005, October 1994. Each of the foregoing is incorporated herein by reference in its entirety.

TABLE 2

| | | Protocol |
|---|---|---|
| 1 | Metals & Inorganics | |
| | Asbestos | EPA 100.2 |
| | Free Cyanide | SM 4500CN-F |
| | Metals - Al, Sb, Be, B, Fe, Mn, Mo, Ni, Ag, Tl, V, Zn | EPA 200.7/200.8 |
| | Anions - $NO_3$—N, $NO_2$—N, Cl, $SO_4$, Total Nitrate/Nitrite | EPA 300.0A |
| | Bromide | EPA 300.0/300.1 |
| | Turbidity | EPA 180.1 |
| 2 | Organics | |
| | Volatile Organics - VOASDWA list + Nitrozbenzene | EPA 524.2 |
| | EDB & DBCP | EPA 504.1 |
| | Semivolatile Organics - ML525 list + EPTC | EPA 525.2 |
| | Pesticides and PCBs | EPA 505 |
| | Herbicides - Regulated/Unregulated compounds | EPA 515.4 |
| | Carbamates | EPA 531.2 |
| | Glyphosate | EPA 547 |
| | Diquat | EPA 549.2 |
| | Dioxin | EPA 1613b |
| | 1,4-Dioxane | EPA 8270m |
| | NDMA - 2 ppt MRL | EPA 1625 |

TABLE 2-continued

| | Protocol |
|---|---|
| 3  Radiologicals | |
| Gross Alpha & Beta | EPA 900.0 |
| Radium 226 | EPA 903.1 |
| Uranium | EPA 200.8 |
| 4  Disinfection By-Products | |
| THMs/HANs/HKs | EPA 551.1 |
| HAAs | EPA 6251B |
| Aldehydes | SM 6252m |
| Chloral Hydrate | EPA 551.1 |
| Chloramines | SM 4500 |
| Cyanogen Chloride | EPA 524.2m |

TABLE 3

Exemplary contaminants for system verification

| | MCLG[1] | |
|---|---|---|
| 1  Metals & Inorganics | | |
| Asbestos | <7 | MFL[2] |
| Free Cyanide | <0.2 | ppm |
| Metals - Al, Sb, Be, B, Fe, Mn, Mo, Ni, Ag, Tl, V, Zn | 0.0005 | ppm |
| Anions - NO$_3$—N, NO$_2$—N, Cl, SO$_4$, Total Nitrate/Nitrite | <1 | ppm |
| Turbidity | <0.3 | NTU |
| 2  Organics | | |
| Volatile Organics - VOASDWA list + Nitrobenzene EDB & DBCP | 0 | ppm |
| Semivolatile Organics - ML525 list + EPTC | <0.001 | ppm |
| Pesticides and PCBs | <0.2 | ppb |
| Herbicides - Regulated/Unregulated compounds | <0.007 | ppm |
| Glyphosate | <0.7 | ppm |
| Diquat | <0.02 | ppm |
| Dioxin | 0 | ppm |
| 3  Radiologicals | | |
| Gross Alpha & Beta | <5 | pCi/l[3] |
| Radium 226 | 0 | pCi/l[3] |
| Uranium | <3 | ppb |
| 4  Disinfection By-Products | | |
| Chloramines | 4 | ppm |
| Cyanogen Chloride | 0.1 | ppm |
| 5  Biologicals | | |
| Cryptosporidium | 0[4] | |
| Giardia lamblia | 0[4] | |
| Total coliforms | 0[4] | |

[1]MCLG = maximum concentration limit guidance
[2]MFL = million fibers per liter
[3]pCi/l = pico Curies per liter
[4]Substantially no detectable biological contaminants In preferred embodiments, the inlet switch is a solenoid activated (opened) when a signal is received indicating that the system is capable of receiving additional water for the purification process. Such feedback of demand for more inlet water can come from various points within the system including, for example, water level in the evaporation chamber, water level in the product storage tank, temperature of preheated water entering the degasser, temperature or volume of steam leaving the evaporation chamber, and the like. Likewise, various alternatives to a solenoid type of switch are available to those of skill in the art, such as, for example, a valve, an aperture, a peristaltic style tube compression mechanism and closure, piezoelectric switching, and the like.

In connection with the flow controller, optionally the flow controller can moderate water flow into the system by varying pressure, and such pressure variations can be signaled by detection within the system of greater demand for inlet water, and the like. This variable control of flow, rather than binary control of flow, can permit capturing certain efficiencies in the system.

Other controls and feedback points can provide further benefit in the automated function of the system including, for example, detection of water quality at any point in the system, detection of volume of water or steam at any point in the system, detection of leaks or temperatures that are indicative of a system malfunction, and the like. Embodiments of the system contemplate all such controls and combinations of controls. These include, for example, controls detecting flooding, storage tank capacity, evaporation chamber capacity, and the like. In various embodiments, feedback can be qualitative and/or quantitative. These can include, for example, the amount of water in a product water container, flow of product water through the product outlet, time of water flow, time of no water flow, amount of water in the evaporation chamber, detection of a leak, evaporation chamber pressure, output water quality (such as, for example, a measure of total dissolved solids), pressure differential across the evaporation chamber or across other points in the system, flow of water across an evaporation chamber overflow weir float, and the like.

Once power is supplied and the system is turned on, the system is configured for fully automatic control essentially throughout the life of the system. The system includes various feedback mechanisms to avoid flooding and to regulate water flow, pressure, output, and cleaning cycles, such that user intervention under normal circumstances is not required. Among these controls are a float level detector in the evaporation chamber, a side float switch, a timer, a fan switch, and a power meter.

Shut down controls include a manual control, a flood control which can be a float or a moisture detector in the base of the system adjacent the holding tank, a tank capacity control and an evaporation chamber capacity control. In addition to controls that provide binary, on/off, switching of inlet water or other parameters, the system further contemplates variable controls such as, for example, pressure- or volume-based flow controls, pressure regulators, and the like. In preferred embodiments, a pressure regulator can regulate inlet water pressure so that it is between 0 and 250 kPa, for example. In other embodiments, the pressure can be 10, 20, 30, 40, 50, 75, 100, 125, 150, 175, 200, 225, 275, 300, 350, 400, 450, or 500 kPa, or more. Regulation of pressure, optionally in combination with regulation of other parameters, can attenuate volume and velocity of water flow in the system. For example, pressure regulation in combination with the dimensions of the system can provide water flow rates of between 5 and 1000 ml/min, or more. Although the systems described herein are primarily described in terms of relatively small scale water production, the system is scalable to any volume of water production. Accordingly there is no upper limit to the volume of water flow. Exemplary flow rates, however, include ranges of 10 to 500 ml/min, 20 to 400 ml/min, 30 to 300 ml/min, 40 to 200 ml/min, 50 to 150 ml/min, 60 to 125 ml/min, 70 to 100 ml/min, 80 to 90 ml/min, and the like.

The system can further include a sediment trap capable of removing sediments from inlet water, so as to avoid premature fouling of the system with such sediments. Various sorts of sediment traps are known in the art, and can be selected for use with the systems of the invention. Likewise, to minimize user intervention and need for cleaning, a sediment trap can itself have self-cleaning features. For example, a sediment trap can have revolving screens, wherein rotation from a fouled screen to a new screen can be driven by a water pressure differential across the device, such that when a screen reaches a certain saturation point in terms of accumulated sediments, it is switched for a screen that is not fouled by sediments. In some embodiments, a fouled screen can be placed into a flow path of water such that water flows across the screen in an opposite direction from that of the original flow across the screen, thus dislodging sediments to a waste pathway or drain. Accordingly the systems disclosed herein contemplate use of conventional as well as self-cleaning sediment traps.

The preheat function of the water purification system preferably involves a preheat tube. However, this function can be performed in numerous different ways, provided that the result is that water flowing into the system arrives at the degasser at a temperature of about 90° C. or more. Accordingly, the preheat function can be embodied in numerous different forms, including, for example, a cylindrical tube, a spiral, a flattened plate or ramified network, a hollow structure of any sort with a design permitting a high ratio of surface area to internal volume, a lumen that is coaxial with a larger or smaller lumen permitting heat exchange across a wall between the lumens, and the like.

In preferred embodiments, the preheat tube passes adjacent to or through the evaporation chamber, and is configured such that the flow rate of inlet water through the preheat tube permits a range of residence time in or near the evaporation chamber sufficient to elevate the temperature of the water in the preheat tube to about 90° C. or more. Depending upon the scale of the system, and the capacity of the system for throughput of water, the preheat function can benefit from materials and configurations that permit efficient heat exchange. Alternatively, in some embodiments, durability of construction, space considerations, ease of maintenance, availability or expense of materials, as well as other considerations can affect the design choices in this aspect of the invention.

In preferred embodiments, the preheat function is a tube of stainless steel, which possesses beneficial properties of durability despite its relatively low heat conductivity. In such embodiments, the stainless steel tube is provided with wall thickness, internal diameter and other properties so as to enhance efficiency of heat exchange between the source of heat and the water inside the tube. In particularly preferred embodiments, the preheat tube is a coil that passes through the evaporation chamber. Preferably, the orientation of the coil is horizontal: water entering the coil and leaving the coil is roughly at the same elevation within the evaporation chamber, and water passing through the coil undergoes a series of upward and then downward movements within the coil which favors mixing of the water with bubbles and avoids coalescence of large bubbles. Such coalescence of large bubbles is generally undesirable to the extent that large bubbles can interfere with normal flow of water through the preheater and into the degasser and/or can interfere with normal function of the degasser. However, in certain embodiments, a degasser function is sufficiently robust to tolerate large volumes of steam coming from inlet water and in such embodiments the design of the preheat function need not be particularly concerned with avoiding such coalescence.

In some embodiments, the system can beneficially function under nonstandard environmental conditions such as, for example, high altitude. At high altitudes, the boiling point of water is less than 100° C., and thus with normal rates of application of heat to the evaporation chamber will generate a greater amount of steam and will permit a higher quantitative throughput in the system. In such embodiments, it is evident that preheat temperatures may also be affected. Given lower evaporation chamber temperatures, preheating to a desired temperature can be achieved by permitting longer residence time of water in the preheat tube such as, for example, by configuring the tube to have a greater volume with an identical flow rate, or a lower flow rate with an identical volume. However, due to elevated levels of steam generation in the evaporation chamber, in most embodiments, adjusting downward the flow rate in the preheat tube to achieve beneficial residence times and desirable preheat temperatures, would be disfavored. This is because the greater rate of steam generation implies a concomitant higher demand for inlet water.

In embodiments in which the preheat tube is coaxial with another tube, heat exchange between any high heat portion of the system and the low heat inlet water can occur. Such heat exchange can be determined by the structure of the region of coaxiality and can be affected significantly by such factors as wall thickness composition of the heat exchange material, and the like. In preferred embodiments, steam condensation is achieved through heat exchange with inlet water, permitting excess heat from waste steam or product steam to transfer to lower temperature inlet water, aiding in the preheat function and in some cases permitting a shorter residence time in the evaporation chamber and/or a higher total flow rate of water through the system. In addition, a further benefit of such heat exchange is increased energy efficiency and less excess heat leaving the system into the surrounding environment. Alternatives to the coaxial arrangements include any conventional confirmations of heat exchange capability, such as, for example, adjacent flat plates; ultimately, any confirmation placing high temperature water or steam adjacent to low-temperature water that permits transfer of the energy from the high temperature water to the low temperature can achieve the heat exchange effect and is contemplated as an embodiment of the present invention.

A key factor in degasser performance is mass transfer ratio: the mass of water going downward in a vertical degasser as compared to the mass of steam going upward. Indeed, degassing function can be accomplished with various configurations that permit mass-transfer counterflow of water with a gas. In some embodiments, the gas is steam; in others the gas can be air, nitrogen, and the like. The velocity and activity of mixing of water with steam is affected by the size, conformation, and packing of the degasser column medium, as well as the void volume between the particles of the medium. In preferred embodiments, the particles of the medium pack to form a spiral. The performance of the degasser is affected by the velocity and volume of steam and water passing therethrough; these can be controlled by such factors as the size of the steam inlet and outlet orifice, water flow rate, and the like. Useful information relating to degasser function and design is provided in Williams, Robert *The Geometrical Foundation of Natural Structure: A Source Book of Design*, New York: Dover, 1979, which is incorporated herein by reference in its entirety.

Control of inlet water flow rate, avoidance of large steam bubbles in the preheat tube, and the like, can therefore aid efficient function of the degasser. When these parameters are not within a desirable range, flooding or jetting can occur in the degasser. Flooding of inlet water forms a water plug in the degasser and jetting shoots water out of the degasser with the steam, either of which can interfere with degasser performance. It is therefore desirable to operate in a zone that minimizes flooding and jetting and that has a good balance between water influx and steam efflux. The degasser of embodiments of the present invention is particularly important in that it is not designed to remove strictly one contaminant as many conventional degassers are. Instead it removes a variety of contaminants very effectively. In typical settings, where the inlet water has a contaminant at, for example, 1 ppm the process seeks to achieve reduction to 50, 40, 10, 5, 2, or 1 ppb.

The evaporation chamber can be of essentially any size and configuration depending upon the desired throughput of the system and other design choices made based upon the factors effecting system design. For example, the evaporation chamber can have a volume capacity of about 1 gallon or 2-10 gallons, 11-100 gallons, 101-1000 gallons, or more. Because the system of the invention is completely scalable, the size of the evaporation chamber is variable and can be selected as desired. Likewise, the configuration of the evaporation chamber can be varied as desired. For example, the evaporation chamber can be cylindrical, spherical, rectangular, or any other shape.

In preferred embodiments, a lower portion of the evaporation chamber is stepped to have a smaller cross-sectional area than the upper section of the chamber. Above the step is preferably a drain, such that upon draining, residual water remains below the step. The portion of the evaporation chamber below the step can also accommodate a cleaning medium such that after drainage all cleaning medium and some residual water is held in the lower portion. The benefit of the lower portion is that after rapid drainage of the evaporation chamber, heat can again be applied to the evaporation chamber, permitting rapid generation of steam prior to arrival of the first new inlet water into the evaporation chamber. This initial generation of steam permits steam flow through the degasser to achieve a steady state when a new cycle begins, which is beneficial to efficiently degassing of the inlet water. Likewise, a residual amount of water in the evaporation chamber avoids dry heating of the evaporation chamber which can be detrimental to the durability and stability of the chamber itself as well as the self-cleaning medium.

In some embodiments, the evaporation chamber drains by gravity only, in other embodiments draining the evaporation chamber is driven by pumping action. It is desirable that the evaporation chamber drain rapidly, to avoid the settling of sediments, salts, and other particulates. Rapid draining is preferably on the order of less than 30 seconds, although draining that is less rapid can still achieve substantially the desired benefits of avoiding settling and so on.

The self-cleaning medium can be selected from any of a number of suitable alternatives. Such alternatives include glass or ceramic beads or balls, stones, synthetic structures of any of a variety of shapes, and the like. In every case, the properties of the self-cleaning medium will be selected such that agitation by boiling water will displace individual particles of the self-cleaning medium, but that such displacement will be overcome by the physical properties of the self-cleaning medium causing each particle to fall again to the bottom of the evaporation chamber, striking it, to dislodge any deposits or scale. For example, a self-cleaning medium with a relatively high specific gravity but with a relatively small surface to volume ratio may function in a way that is roughly comparable to a second self-cleaning medium with a lower specific gravity but a relatively higher surface to volume ratio. In each case, a skilled artisan is able to select the combination of morphology, and composition to achieve the desired result. In some embodiments, an alternative approach to self-cleaning is employed, such as, for example, application of ultrasonic energy.

Another consideration in the design choice of the self-cleaning medium is the hardness thereof. In general, the hardness should be roughly comparable to the hardness of the material of which the evaporation chamber is composed. This permits continued use of the self-cleaning medium over long periods of time without significant erosion of the medium or of the walls or bottom of the evaporation chamber. In some embodiments, in which the heating element of the evaporation chamber is internal to the chamber, hardness and other properties of the self-cleaning medium can be selected so as to avoid erosion and/or other damage to the heating element as well as to the evaporation chamber itself.

Because of the self-cleaning function provided by the structure of the evaporation chamber and the evaporation chamber cleaning medium, the system of embodiments of the invention does not require cleaning during its normal life span of use. In some embodiments no cleaning is required for 2, 3, 4, 5 or 6 months. In other embodiments, no cleaning is required for 9, 12, 18, 24, 30, or 36 months. In other embodiments, no cleaning is required for 4, 5, 6, 7, 8, 9, 10 years, or more.

The heating element can be positioned in either within the evaporation chamber, just below the evaporation chamber, or can be integral therewith. For example, in preferred embodiments, the heating element is positioned just below the bottom of the evaporation chamber and is bonded to the evaporation chamber bottom by brazing, for example. The attachment method of the heater to the evaporation chamber can affect the cleaning and agitation of the self-cleaning medium, and the efficiency of the system. Brazing, roughly comparable to soldering, is a process that forms an alloy wedding to dissimilar metals, permitting a very close contact and heat transfer from the heating element to the evaporation chamber. In preferred embodiments, the heating element and the bottom of the evaporation chamber form a horizontal plate which is preferably for heat transfer to the water and also preferable for the self-cleaning function.

The residence time of water in the evaporation chamber can vary within a range based upon the nature of the inlet water and the desired performance of the system. The suitable range is determined by various factors, including whether biological contaminants are in the input water. Effective removal of biological contaminants can require a variable amount of time being exposed to the high temperatures in the evaporation chamber. Some biological contaminants are more quickly susceptible to high heat than are others. In many embodiments, a residence time as short as 10 minutes is sufficient to kill most biological contaminants. In other embodiments, longer residence times may be desired in order to more thoroughly eliminate a broader spectrum of biological contaminants. The upper end of the range of residence time in the evaporation chamber is typically dictated by efficiency considerations relating to the desired rate of generation of product water in comparison with the energy required to maintain a selected volume of water at boiling temperature. Accordingly, residence time in the evaporation chamber can be as little as the minimal time required for water to reach boiling point and evolve as steam, to time points beneficial to removal of biological contaminants such as, for example, 10, 15, 20, 25, 30, 35, 40, 45 minutes and the like and so on. Further, higher residence times such as, for example, 50, 60, 70, 80 and 90 minutes, or more, may be selected in some embodiments.

Steam exiting the evaporation chamber is generally free of particulates, sediments, and other contaminants. However, boiling action can cause certain contaminants to be carried into the vapor phase, for example on the surface of microdroplets of mist formed at the air/water interface. Clean steam can be separated from such contaminant-laden mist with use of a demister. Various kinds of demisters are known in the known in the art, including those employing screens, baffles, and the like, to separate steam from mist based upon size and mobility. Preferred demisters are those that employ cyclonic action to separate steam from mist based upon differential density. Cyclones work on the principle of moving a fluid or gas at high velocities in a radial motion, exerting centrifugal force on the components of the fluid or gas. Conventional cyclones have a conical section that in some cases can aid in the angular acceleration. However, in preferred embodiments, the cyclone demisters employed in the system do not have a conical section, but are instead essentially flat. Key parameters controlling the efficiency of the cyclone separation are the size of the steam inlet, the size of the two outlets, for clean steam and for contaminant-laden mist, and the pressure differential between the entry point and the outlet points.

The demister is typically positioned within or above the evaporation chamber, permitting steam from the chamber to enter the demister through an inlet orifice. Steam entering a demister through such an orifice has an initial velocity that is primarily a function of the pressure differential between the evaporation chamber and the demister, and the configuration of the orifice. Typically, the pressure differential across the demister is about 0.5 to 10 column inches of water—about 125 to 2500 Pa. The inlet orifice is generally designed to not provide significant resistance to entry of steam into the cyclone. Steam then can be further accelerated by its passing through an acceleration orifice that is, for example, significantly narrower than the inlet orifice. At high velocities, the clean steam, relatively much less dense than the mist, migrates toward the center of the cyclone, while the mist moves toward the periphery. A clean steam outlet positioned in the center of the cyclone provides an exit point for the clean steam, while a mist outlet positioned near the periphery of the cyclone permits efflux of mist from the demister. Clean stem passes from the demister to a condenser, while mist is directed to waste. In typical operation, clean steam to mist ratios are at least about 2:1; more commonly 3:1, 4:1, 5:1, or 6:1; preferably 7:1, 8:1, 9:1, or 10:1, and most preferably greater than 10:1. Demister selectivity can be adjusted based upon several factors including, for example, position and size of the clean steam exit opening, pressure differential across the demister, configuration and dimensions of the demister, and the like. Further information regarding demister design is provided in U.S. Provisional Patent Application No. 60/697,107 entitled, IMPROVED CYCLONE DEMISTER, filed Jul. 6, 2005, which is incorporated herein by reference in its entirety. The demisters disclosed herein are extremely efficient in removal of submicron-level contaminants. In contrast, demisters of other designs such as, for example, screen-type and baffle-type demisters, are much less effective at removing submicron-level contaminants.

Product and waste steam is typically condensed in the system. Excess heat can be exhausted by a heat sink, a fan, a heat exchanger, or a heat pipe. A discussion of heat pipes for transferring heat from condensing steam to inlet water is provided in U.S. Provisional Patent Application No: 60/727, 106 entitled, ENERGY-EFFICIENT DISTILLATION SYSTEM, filed Oct. 14, 2005, which is incorporated herein by reference in its entirety.

Product steam condensed to purified water is channeled to a product outlet or a storage tank, for example. Storage tanks can be of any suitable composition that resists corrosion and oxidation. Preferred compositions for storage tanks include stainless steel, plastics including polypropylene, and the like.

In some embodiments, the storage tank includes controls to avoid overflow and/or detect water level. Such controls can attenuate flow of inlet water and/or other functions of the system such that production of product water is responsive to demand therefore. Although product water entering the storage tank is extremely clean and essentially sterile, it can be desirable to provide an optional cleaning/sterilization function in the storage tank, in case an external contaminant enters the tank and compromises the cleanliness thereof.

Within the storage tank can be various controls for feedback to the overall control system. In preferred embodiments, these controls can include a float switch for feedback to control the flow of inlet water, and a conductivity meter to detect dissolved solids in the product water. In typical operation, dissolved solids in the product water will be exceedingly low. However, if a contaminant were to be deposited into the storage tank, such as for example by a rodent or insect, the resulting contamination would increase the conductivity of the water. The conductivity meter can detect such an elevation of conductivity and provide an indication that it may be advisable to initiate a steam-sterilization cycle of the storage tank. The control system can have the capability of draining the water from the storage tank, sending a continuous supply of steam into the storage tank to clean and sterilize it, and then re-start a water purification cycle. These operations can be manually controlled or automatically controlled, in various embodiments of the invention.

Water can be delivered from the storage tank to an outlet, such as a faucet, and such delivery can be mediated by gravity and/or by a pump. In preferred embodiments, the pump is an on-demand pump that maintains a constant pressure at the outlet, so that water flow from the outlet is substantial and consistent. The outlet pump can be controlled by a sensor in the storage tank to avoid dry running of the pump if the water level in the tank is below a critical level.

Exemplary Water Purification System

The following discussion makes reference to structural features of an exemplary water purification system according to embodiments of the invention. Reference numerals correspond to those depicted in FIGS. 1-6.

In operation the purification system 10 includes an inlet port 20 which connects to an inlet water tube 22, through which water passes from the inlet port 20 to an inlet switch 24. The inlet switch 24 can be controlled by one or more of various possible feedback sources from the control system. In the depicted embodiment, the switch 24 is a solenoid that can be open or shut based upon feedback from the control system 120, primarily based upon feedback of the level of water in the evaporation chamber 50. The inlet switch 24 includes a sediment trap 25 to avoid fouling the system 10 with sediments. Adjacent the inlet switch 24 is a flow regulator 26. The flow regulator 26 regulates flow by controlling the water pressure, generally maintaining water pressure between 0 and 250 kPa.

Water exits the flow regulator 26, to a preheater feed tube 28, which delivers water to the preheater 30. Optionally, a pre-filter can be positioned at one or more places between the inlet port 20, the switch 24, and the inlet water tube 22, flow regulator 26, and the preheat feed tube 28. Water enters the preheater 30 at an inlet 32, passes through a coil 34, and leaves the preheater at an outlet 36. The coil 34 is oriented such that net flow of water through the coil 34 is in a substantially horizontal orientation, while the actual pathway of water through the coil 34 involves multiple passages through the horizontal plane including upward and downward flow of water through the coil 34 as well as horizontal water flow at the top and bottom of each turn of the coil 34. It is believed that passing hot water through a coil oriented in this way permits preheating of water while maintaining a desirable mixing of the water which can avoid formation of large gas or vapor bubbles. In preferred embodiments, the preheater is substantially positioned within the evaporation chamber 50, and preferably is in close proximity with the portion of the evaporation chamber that is in contact with the heating element 56.

Water leaving the preheater 30 at the outlet 36, enters the preheated water tube 38 and passes therethrough to arrive at the degasser 40. Upon departure of water from the preheater 30, water is at least about 96° C., preferably about 97, 98, or 99° C., or more. Preferably the degasser 40 is in a substantially vertical orientation. By substantially vertical is meant in preferred embodiments within 0 to 5 degrees of divergence from plumb, or true vertical. In other embodiments, substantially vertical can mean divergence of about 5 to 20 degrees. In other embodiments, substantially vertical can mean divergence of about 20 to 45 degrees. The configuration of the degasser 40 is generally cylindrical, preferably with a greater height than diameter. Accordingly, preheated water enters the degasser 40 adjacent the degasser top 42 and exits the degasser 40 adjacent the degasser bottom 44, thus entering the evaporation chamber 50. By adjacent is meant at or near; thus, for example, a water entry point "adjacent" the top 42 can indicate entry of water directly at or through the top 42 or can indicate entry of water in a region of the degasser 40 that is substantially closer to the top 42 than to the bottom 44.

The pathway of water downward through the vertically oriented degasser 40 places the water into a flow pattern in intimate contact with the degasser medium 45. In preferred embodiments, the degasser medium includes spherical particles. The spherical particles are preferably glass. In alternative embodiments, the particles can be of different composition and/or can be non-spherical and/or irregular in shape. A more detailed discussion of various degasser improvements and configurations is provided herein under the section heading DEGASSER APPARATUS, below.

Steam from the evaporation chamber 50 enters the degasser 40 adjacent the bottom 44 and rises vertically in contact with the medium 45 to exit the degasser adjacent the top 42 through a degasser steam outlet 46. Water flowing downward through the degasser 40 encounters steam rising upward through the degasser medium 45 and is stripped of essentially all gasses and organics. The significantly nonlinear counterflow of preheated water downward and steam upward thorough the degasser medium 45 facilitates removal of volatile compounds and substantially all compounds in gaseous form. Advantageously and unexpectedly, this degasser 40 configuration and function also permits removal of organic contaminants in the water that otherwise would be extremely difficult to remove. For example, the system permits removal of isopropyl alcohol from water; isopropyl alcohol is a particularly difficult contaminant for most systems to remove, because of the similarities of its properties with those of water.

Steam leaving the degasser 40 through the steam outlet 46 enters a waste condenser 48 where it condenses and flows to waste. In an alternative embodiment, all or part of the waste condenser 48 function is performed by heat exchange with any portion of the inlet tube 22, the preheater feed tube 28, or the preheater 30, with the effect that heat from the degasser waste steam is exchanged to preheat the inlet water. This heat exchange has the dual benefit of exhausting excess heat from the system 10 such that this heat is not radiated to the local environment of the system 10, as well as adding an increment of efficiency by providing energy for preheating inlet water prior to degassing. The heat exchange configuration can include various approaches to heat exchange. In some preferred embodiments, heat exchange is accomplished by coaxial orientation of a waste steam tube and a preheat tube.

Degassed water drains adjacent the bottom 44 of the degasser 40 into the evaporation chamber 50. The evaporation chamber 50 preferably includes at least two segments, an upper segment 52 and a lower segment 53. The segments are joined at a segment junction 54. In preferred embodiments, the evaporation chamber 50 is generally cylindrical, the upper segment 52 having a larger diameter than the lower segment 53. In some embodiments the segment junction 54 is substantially horizontal while in others it can have a sloping orientation. At the bottom 55 of the lower segment 53, and in close contact therewith, is an evaporation chamber heating element 56. Positioned at or near the junction 54 is an evaporation chamber drain 60.

Also contained within the evaporation chamber 50 is an evaporation chamber cleaning medium 58. In preferred embodiments the evaporation chamber cleaning medium 58 is a population of ceramic particles 59, substantially spherical in shape. The particles 59 have a size and density selected to permit the particles 59 to remain near the bottom 55 of the evaporation chamber 50 despite agitation by boiling water, while having properties, such as size and density, so that boiling action agitates the particles 59. Likewise, evaporation chamber particles 59 also preferably have a hardness that permits prolonged abrasion of the bottom 55 without deleterious degradation of the particles 59 or the bottom 55. In operation, the boiling action agitates the particles 59, raising them into the boiling water. When a particle 59 is agitated and elevated by boiling action, it later drops, striking the bottom of the evaporation chamber. This continual rising, falling, and striking action scours the bottom 55 of the evaporation chamber 50 and prevents buildup of scale or other deposits.

Positioned at or above the evaporation chamber segment junction 54 is an evaporation chamber drain 60. It is preferred to position the evaporation chamber drain 60 at or above the junction 54 so that upon draining the evaporation chamber 50 in a cleaning cycle, water drains from the upper segment 52 but not from the lower segment 53. After a draining cycle, the lower segment 53 contains the evaporation chamber cleaning medium 58 and evaporation chamber water. This provides sufficient water to permit generation of steam essentially immediately upon initiation of another cycle, which steam can rise and enter the degasser 40. The configuration of the evaporation chamber drain 60 is preferably of sufficient internal dimensions to permit very rapid draining of the evaporation chamber 50, which avoids settling of sediments. Further, the evaporation chamber drain 60 preferably has an opening that is configured so as not to be complementary with the shape of the particles 59 of the evaporation chamber cleaning medium 58. This designed non-complementarity prevents an evaporation chamber cleaning particle 59 from articulating with the evaporation chamber drain 60 and interfering with proper drainage.

Flow of water into the evaporation chamber 50 and/or evaporation chamber volume are selected such that water in the evaporation chamber 50 has an average residence time of approximately 45 minutes. Such residence time exceeds commonly accepted times for sterilization by boiling, thus killing any biological contaminants in the water. The evaporation chamber 50 further includes an evaporation chamber cover 61. An evaporation chamber steam outlet 62 in the evaporation chamber cover 61 permits steam to exit the evaporation chamber 50 and enter the demister 70. Steam leaving the evaporation chamber into the demister is substantially free of gasses, volatiles and organics—having passed through the degasser 40—and likewise is substantially free of sediments, particulates, biologicals, minerals, and the like, given that substantially all such contaminants remain in liquid water in the evaporation chamber 50, rather than in the steam leaving the evaporation chamber 50. However, such steam can contain small contaminants that are carried into the vapor phase by the boiling action. Thus, steam leaving the evaporation chamber 50 into the demister 70 requires separation into clean steam and contaminant-containing mist.

The demister 70 operates on a cyclone principle. Steam enters the demister 70 via a demister inlet chamber 72. Steam flows from the demister inlet chamber 72, through a demister orifice 74, and into a demister cyclone cavity 75. The cyclone cavity 75 is substantially cylindrical, and the shape and orientation of the demister orifice 74 is selected so as to direct steam entering the orifice 74 to the periphery of the cyclone cavity 75 at a high velocity, thus creating a cyclone effect. Rotation of the steam at high velocity about the axis of the cyclone cavity 75 permits separation based upon density differences of clean steam and contaminated mist. Clean steam, being less dense, is driven toward the center of the cyclone cavity 75, and exits the cyclone cavity 75 through a demister clean steam outlet 76. Clean steam exiting the outlet 76 flows into a clean steam outlet tube 78, while contaminated mist exits the cyclone cavity 75 through a demister waste outlet 80.

Clean stem flows from the outlet tube 78 into a product condenser 90. The product condenser, in preferred embodiments, includes coiled tubing having dimensions and composition selected to permit efficient exchange of heat. A condenser fan 94 cools the product condenser coil 90 and the waste condenser coil 48. Condensed clean steam forms product water and is directed to a storage tank 100 via a product tube 96. Positioned along the product tube 96 is a three-way valve 98. In operation, three-way valve 98 can direct product water toward waste or toward the storage tank 100.

In a typical purification cycle, during an initial period of evaporation chamber 50 warm-up and filling—prior to full functioning of the preheating and degassing functions of the system—the first several minutes of a new cycle involve increasing temperatures in the preheater 30 and the degasser 40. Eventually the system attains preheat temperatures and steam volumes that permit effective degassing. Thus, during warm up in a purification cycle, prior to fully effective degassing, steam exiting the evaporation chamber 50 can be contaminated with residual volatiles and organics. In order to avoid these contaminants entering the storage tank 100, steam entering the demister clean steam outlet tube 78, and condensing into water in the product condenser 90, during the first 20 minutes of the cycle, is shunted by the three-way valve 98 to waste. After 20 minutes of system warm-up, the preheater 30 and degasser 40 are fully functional, the clean steam leaving the demister is substantially free of volatiles and organics, and the three-way valve switches to permit collection of product water into the storage tank 100. When water is not being withdrawn from the storage tank 100, the system can cycle in about 24 hours from initial startup, through tank fill-up. If water is being consumed, the system can produce about 2.5 gallons in about 10 hours. The storage tank 100 has a volume of 6 useable gallons. Although user intervention and cleaning is not required, the system does provide for the user to select a steam sterilization cycle in the collection tank 100 if and when such cleaning is desired.

The system further includes a product pump 102 which maintains a substantially constant pressure of product water at the outlet port 104. A user interface panel 110 includes an LED showing on/off status of the system as well as various optional manual controls if desired.

Control Circuitry

Figure 7:
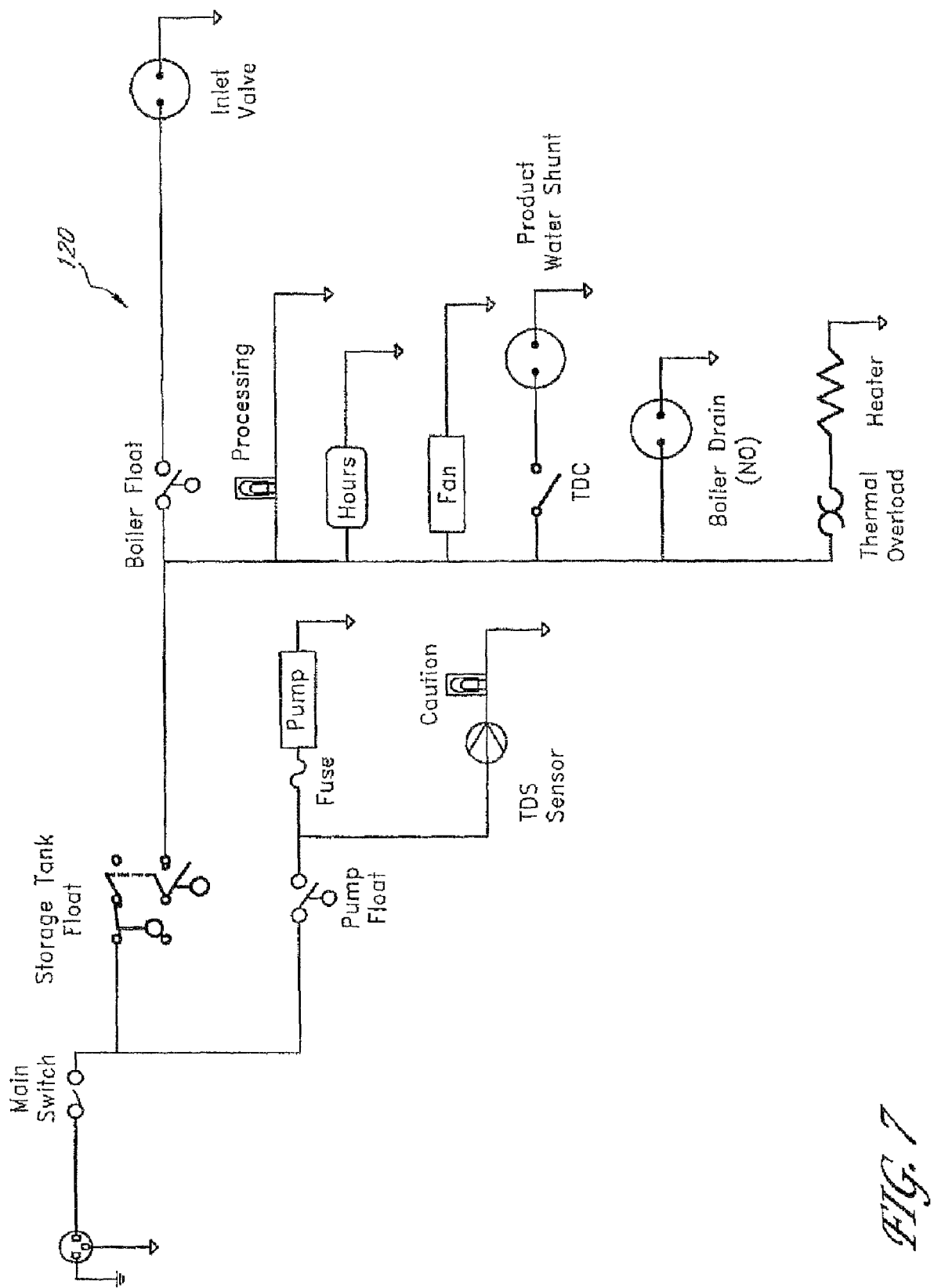
FIG. 7 is a diagram of the control circuitry of an embodiment of the water purification system.

This discussion is aided by reference to FIG. 7. When the main power switch is energized, the control circuitry determines the water level status in the holding tank by means of a float switch within the tank. If the control system determines that there is a need to replenish water in the holding tank, it initiates the water purification sequence.

During the water purification cycle, the control circuitry closes the evaporation chamber drain valve, opens the inlet water valve, and energizes the "Processing" lamp, the evaporation chamber heating element, the hours counter, and the cooling fan. The control circuitry also monitors the water level in the evaporation chamber by means of a float switch, and adjusts the flow of incoming water as necessary. The flow adjustment is controlled by the inlet switch, solenoid that receives feedback from the float switch in the evaporation chamber. As a safety feature, the control circuitry also monitors the temperature of the heater and of the evaporation chamber and will interrupt power to the heater if necessary.

After a pre-determined interval, preferably 20 minutes, during which the system thermally stabilizes, the control circuitry automatically switches pure water output flow from the bypass mode to the holding tank. Once the control circuitry has determined that the holding tank is full, it shuts down the water purification sequence and initiates the self cleaning feature of the system.

The system's control circuitry continually monitors the status of the water in the holding tank for both quantity, via the float switch, and quality via conductivity, for example. If the quality of the water deteriorates, the control circuitry sends a signal to illuminate a caution light. If the quantity of water is low, the control circuitry automatically begins processing pure water to replenish the holding tank as described above.

The control circuitry also maintains a check on the water delivery pump, and will cut off power to the pump if there is an overload or if the water level in the tank is too low to deliver a reliable supply of pure water. Finally, the control circuitry will also monitor the system for water leakage via a float switch in a bottom pan housing the system. This switch is activated upon accumulation of an significant amount of water in the pan, in which case the control circuitry will shut the entire system down due to the leak.

Example 1

Removal of Nonvolatile or Volatile Organics in Degasser

As a demonstration of the effectiveness of the degasser in the described embodiment of the invention, a test was conducted with isopropyl alcohol in the input water. The system was permitted to charge to achieve full function of the degasser: the system was warmed up such that the preheat function was achieved and a steady state volume of steam was delivered from the evaporation chamber into the degasser. A sample of input water containing 4 ppm of isopropyl alcohol was introduced into the system and product water from such sample was then quantitatively tested for presence of isopropyl alcohol. A reduction of approximately 100× was noted: the concentration of isopropyl alcohol in the output water was about 40 ppb.

Example 2

Removal of Biological Contaminants

The total coliform group is relatively easy to culture in the lab, and therefore, has been selected as the primary indicator bacteria for the presence of disease causing organisms. Coliform bacteria are not pathogenic (disease causing) organisms, and are only mildly infectious. For this reason these bacteria are relatively safe to work with in the laboratory. If large numbers of coliforms are found in water, there is a high probability that other pathogenic bacteria or organisms, such as *Giardia* and *Cryptosporidium*, may be present. Public drinking water supplies are tested to demonstrate the absence of total coliform per 100 mls of drinking water. Approved tests for total coliform bacteria include the membrane filter, multiple tube fermentation, MPN and MMO-MUG ("Colilert") methods. The membrane filter method uses a fine porosity filter which can retain bacteria. The filter is placed in a petri (culture) dish on a pad with growth enrichment media (mEndo) and is incubated for 24 hrs at 35 degrees C. Individual bacteria cells which collect on the filter grow into dome-shaped colonies. The coliform bacteria have a gold-green sheen, and are counted directly from the dish. Since some other bacteria may develop a similar color, a confirmation test using more specific media is required. The confirmation procedure requires an additional 24 to 48 hrs to complete the test for suspected positive total coliform tests.

An inlet water sample is cultured to detect the presence of coliform bacteria. A 100 ml sample of water is cultured and coliform colonies are detected. The inlet water is treated in the system as described herein, and a corresponding test of 100 ml of product water is cultured. No coliform colonies are detected, indicating that the product water is free of biological contaminants.

Degasser Apparatus Detail and Alternatives

Degassing water is normally achieved by heating the incoming water to increase the vapor pressure of volatile compounds. At the boiling point of each compound, the solubility of the dissolved gas drops to zero and the gas will then exit the water. For example, many of the volatile substances found in drinking water are chlorinated compounds that normally have very large partial pressures at temperatures well below the boiling point of water. Thus, many of these substances can be removed from water by heating the water to temperatures of about 200-210° F. (93-99° C.) to effect proper degassing. However, the substances do not completely leave the water immediately; thus, it takes some period of time to completely remove the dissolved gases.

One difficulty with previous degasser designs, e.g., in water purification systems used for residential applications, is that they have little control of the residence time of the heated water in the degasser. Consequently, when excessive amounts of volatile substances are present in the incoming water, there may not be sufficient residence time provided to effect degassing of all the volatile substances. Additionally, many degassers operate in the absence of pressure controls, which can lead to excessive loss of water vapor, when water vapor is the medium selected for effecting mass transfer of the volatile components out of the system.

Another issue in degasser design is scalability. While large industrial degassers operate with substantial pressure drops and large volumes of both liquid and gases that are effective for mass transfer and, thus, degassing, small degassers do not scale down well and operating them at throughputs of less than 10 gallons per day has been a challenge.

What is needed is a more compact degasser that allows for additional residence time, that is also capable of limiting the amount of wasted steam in a system for point-of-use or point-of-entry.

In some embodiments, a degasser is provided, which has concentric layers of particles, where an inner layer of particles is configured to result in comparatively small spaces between the particles, and where an outer layer of particles is configured to result in comparatively larger spaces between the particles. In various embodiments, the particles exhibit random and structured packing in the degasser. The particles can be made of a material such as, metal, glass, and plastic. The degasser can have a water entrance at the top. The degasser can have a waste steam exit at the top, and have a heated steam entrance and water exit at the bottom.

In some embodiments, a degasser apparatus is provided that has a container that holds concentric layers of particles, where an inner layer of particles is configured to result in small spaces between the particles, where a middle layer of particles is configured to result in medium spaces between the particles, and where an outer layer of particles is configured to result in larger spaces between the particles. The medium spaces are such that water vapor in the system begins to condense out of the gas phase, and the small spaces are small enough that this process continues so that water vapor is transformed into liquid water.

In other embodiments, the degasser container has a steam entrance at the bottom outer periphery of the container. The steam entrance allows heating steam from a boiling chamber to enter the container at the outer periphery and heat the outer periphery of the inside of the degasser. The container has a steam exit at the top of the container where waste steam exits the system. The container has a water entrance at the top of the container. The container has a purified water exit at the bottom of the container. The water exit is located, for example, in the center bottom of the container. The container is filled with particles. There are, in some embodiments, three sizes of particles and each particle of a given size is located in a concentric zone; thus, in such embodiments, there are three concentric zones, each having a particle of a given size. In a preferred embodiment, the particles are glass beads. In a more preferred embodiment, there are three sizes of particles with the largest sized particle in an outermost zone of the container and the smallest sized particle in an innermost zone of the container. In a most preferred embodiment, there is an outermost zone or layer having 8 mm glass beads, a middle zone or layer having 6 mm glass beads, and a center zone or layer having 4 mm glass beads in the container. In some embodiments, the beads are made from soda/lime glass. In such embodiments, twenty 3 mm beads can weight about 0.7 grams, twenty 4 mm beads can weigh about 1.8 grams, twenty 6 mm beads can weigh about 5.7 grams and twenty 8 mm beads can weigh about 14.4 grams.

Some embodiments include a compact, more effective, degasser. The degasser preferably employs concentric layers of varying porosity so that a zone is created in the degasser that allows steam to pass and another zone is created that promotes water vapor condensation. The degasser includes particles inside the degasser that add surface area to the inside of the degasser, thereby allowing for a greater residence time for the water to be purified.

In some embodiments, the porosity of the system is achieved through differently sized particles. In these embodiments, the particles in the outer layer have a relatively large size so that heating steam can more readily pass from a source of steam, such as an evaporation chamber, into and throughout the degasser. This heating steam, coming from the evaporation chamber, can also act as an insulator to keep the inside temperature of the system near the boiling point. Inside the outer layer of larger sized particles is a layer of medium sized particles. This layer of medium sized particles provides for adequate permeability and long residence time, allowing for a higher percentage of the volatile substances to be degassed. This medium sized layer of pores and particles is more likely to condense water from the steam, as there is less space between the particles. The inner layer includes smaller sized particles, so that the pores are mostly filled with degassed water, which flows, by gravity, into the evaporation chamber.

Figure 8:
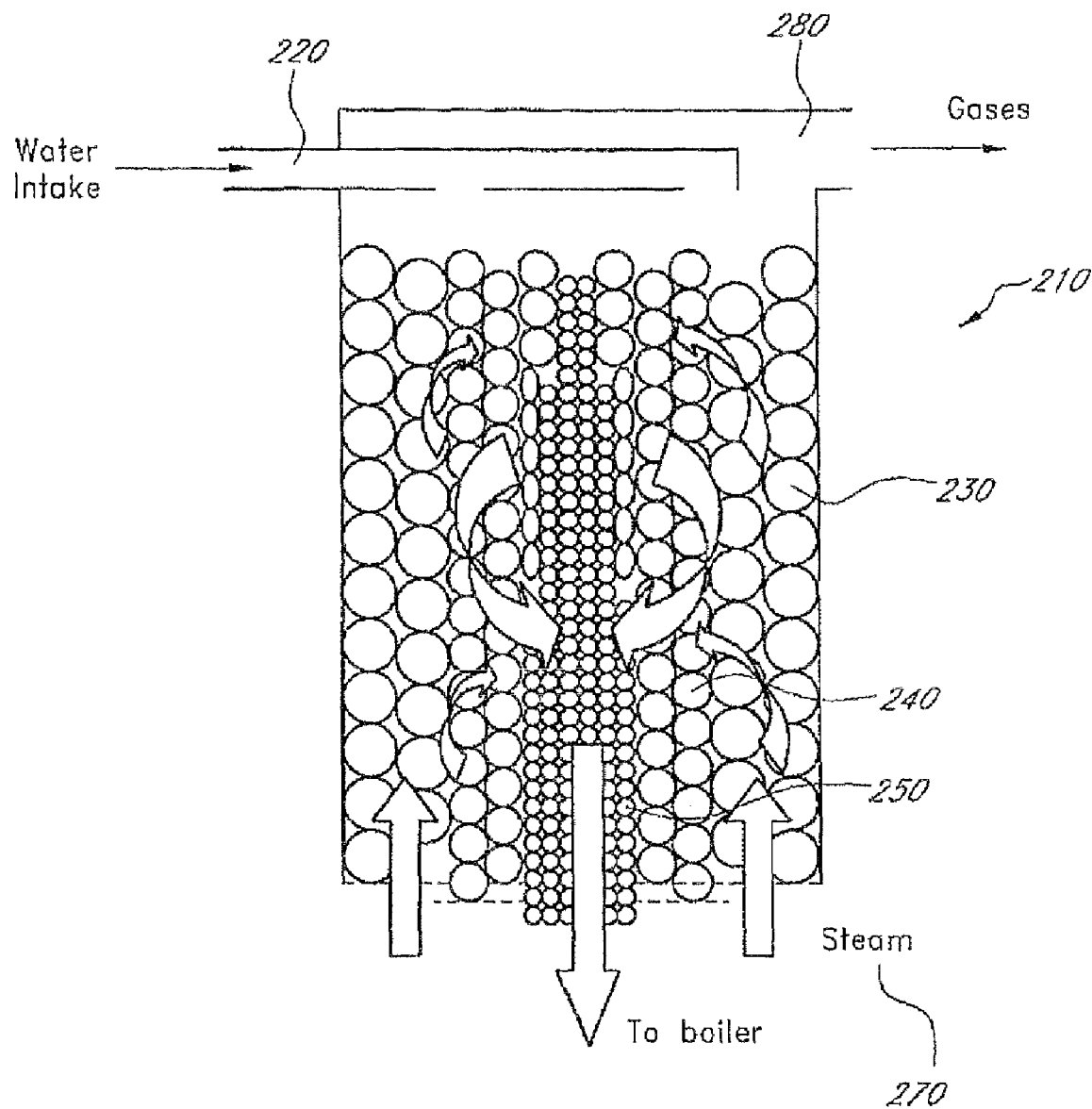
FIG. 8 is a cross-sectional diagram of an exemplary degasser apparatus.

FIG. 8 illustrates the concept of a typical degasser unit 210. In a preferred embodiment, incoming water or other liquid to be degassed flows in through the top of the degasser through the intake port 220. Preferably, the incoming water is warm or hot. The water can flow freely through the degasser, which is packed with a series of particles. Preferably, the particles are glass beads. The incoming water is further heated via steam in the degasser, from an evaporation chamber. The outer particles 230 are larger than the middle layer of particles 240, which are in turn larger than the inner layer of particles 250. The increased surface area of the beads toward the central axis of the degasser allows for a larger amount of a volatile gas to be stripped from the water. The larger particles provide for a zone 230 through which heated steam can be added to the degasser, rapidly and efficiently, while the medium and smaller sized particles provide zones 240 and 250 in the degasser where the stripped steam can condense into liquid form and drain out of the degasser, e.g., into an evaporation chamber apparatus, which is preferably located below the degasser. As will be appreciated by one of skill in the art, items 230, 240, and 250 can refer to either the particles themselves, or the zones of porosity, which in the depicted embodiments are created from the spaces between the particles.

Steam 270 is added to the degasser, primarily to add heat to the system. The various gases can exit the system through the exit port 280 which is preferably located at or near the top of the unit. As the section of the degasser that will result in the condensation of the steam back into water is the section with the smaller spaces between the particles, and as this section is in the center of the degasser, this arrangement can allow for steam to circulate and heat the outer section of the degasser, while the steam will condense in the center section of the degasser and drain into the next section. As will be appreciated by one of skill in the art, the position of the differently sized particles and the different zones can be altered. For example, in some embodiments, the smaller particles are positioned on the outer periphery of the degasser, the medium particles inward, and the larger particles in the center. Additionally, the medium sized can be positioned in the center or the outer periphery. In such embodiments, the positions of the steam inlet and outlet, and the outlet for degassed water, are preferably relocated accordingly. However, the preferred embodiment is depicted in FIG. 8.

The degasser system is preferably located in close proximity to the evaporation chamber apparatus. Preferably, the degasser unit is located on the top of an evaporation chamber. This allows steam from the evaporation chamber to rise directly from the evaporation chamber into the degasser. This also allows the degassed water from the degasser to drain straight into the evaporation chamber. As will be appreciated by one of skill in the art, there need not be any significant separation between the evaporation chamber and the degasser. In one embodiment, only a screen, to retain the particles, separates the degasser from the evaporation chamber.

The particles can be of any shape, for example, spherical, semi-spherical, amorphous, rectangular, oblong, square, rounded, polyhedral, irregular (such as gravel, for example), and the like. The particle surface can be varied as desired, such as, for example, solid, porous, semi-porous, coated, or structured to provide large residence time, and the like. Preferably, the particles are spherical and nonporous. One of skill in the art will appreciate that the differently sized particles will have differently sized spaces between them (interstitial spaces). For example, larger glass spheres will have larger spaces than smaller glass spheres. The size of the interparticle space can vary based on the size of the particles, the shape of the particles, and other factors. As a general rule, generally spherical particles that are larger will also result in a mixture with larger porosity. That is, there will be relatively large spaces between the spheres. Likewise, particles that are smaller will have smaller interstitial spaces, resulting in an environment that is more likely to condense steam into liquid water.

The particles can be made of any suitable material. Exemplary materials include but are not limited to metal, glass, composites, ceramics, plastics, stone, cellulosic materials, fibrous materials and the like. A mixture of materials can be used if desired. One of skill in the art will be able to determine a suitable material for each specific purpose. Preferably, the material is made of glass. The chosen material will preferable be capable of standing up to long term high temperature use without significant cracking, breaking, other damage, or leaching toxic materials into the water. If desired, the differently sized particles can be made of different materials. For example, the outer particles can be made of metal, the middle layer of temperature resistant plastic, and the center layer of glass. The chosen material can preferably be resistant to breakage, rust, or cracking due to the heating process.

One of skill in the art will appreciate that the particles can be chosen to be of any desired size. For example, the outer particles can have a diameter ranging from about 5 mm to about 25 mm, or greater. The middle layer of particles can have a diameter ranging, for example, about 1 mm, or less, to about 15 mm, or greater. The center layer of particles can have a diameter ranging, for example, from less than about 0.1 mm to about 10 mm, or greater. In general, the diameter can range from between about 0.1 mm to about 30 mm.

In a preferred embodiment, the concentric layers of particles are glass beads, having, for example, an outermost layer having 8 mm glass beads, a middle layer having 6 mm glass beads, and a center layer having 4 mm glass beads. The ratio of the diameter of the outer particles to the diameter of the inner particles can be varied as desired by one of skill in the art. The ratio of outer particle size to inner particle size can be, for example, from about 1.1 to 1,000:1.

Preferably, the particle layering is in concentric circles, with the smallest sized particles at the center of the unit, while the largest particles are closest to the outside wall of the unit. As will be appreciated by one of skill in the art, the circles need not be precise, and need not necessarily be concentric. For example, while nonconcentric circles will not necessarily have all of the benefits of the depicted embodiment, embodiments that have zones of large porosity that lead steam into zones of smaller porosity can function well and provide the major benefits of the invention. In some embodiments, the various zones or differently sized particles are kept in discrete groups through the use of a screen. In a preferred embodiment, the variously sized particles are kept in discrete groups by the way they are packed into the container, where the small particles are prevented from mixing with the larger particles by the presence of the medium sized particles.

If desired, more than 2 or 3 layers can be used. For example, 4, 5, 6, or 7 layers or more can be used. In a preferred embodiment, three layers are used, each of a different size. In some embodiments, rather than altering the size of the particles, other properties of the particles are altered, such as the surface properties of the particles. Further, if desired, the degasser can be packed with a mixture of differently sized particles, where the packing procedure is performed so as to allow a progressively smaller particle size to fill the center regions of the degasser. In some embodiments, the layers are packed with particles that are homogeneous throughout the layer. In other embodiments, the layers are heterogeneous and can contain other shaped beads, particles, glass wool, etc. Heterogeneity of the particles can include not only size but also, for example, composition, surface characteristics, density, specific heat, wettability (hydrophobicity versus hydrophilicity), hardness, ductility, and the like. Preferably, as discussed above, the heterogeneity in whatever form it takes is distributed in concentric rings within the degasser, although other arrangements that are not concentric are also contemplated in some embodiments of the invention.

The degasser apparatus walls and inlet/outlet ports can be made of any suitable material. Exemplary materials include, for example, metal, aluminum, glass, composite materials, temperature resistant polypropylene, and the like. Preferably, the wall material is made of rust-resistant steel. Preferably, the material will stand up to long term use with high temperatures without cracking, breaking, or leaching toxic materials into the water.

In some embodiments, the degasser is used for providing adequate residence time for degassing water, even if the water contains objectionable amounts of volatile substances. Thus, the degasser can be used to produce safer drinking water, or less toxic water for many other uses.

Examples of volatile contaminants that can be removed or lessened by treatment of water with the method of the present invention include but are not limited to, methyl tertiary butyl ether, benzene, carbon tetrachloride, chlorobenzene, o-dichlorobenzene, p-dichlorobenzene, 1,1-dichloroethylene, cis-1,2-dichloroethylene trans-1,2-dichloroethylene, dichloromethane, 1,2-dichloroethane, 1,2-dichloropropane, ethylbenzene, styrene, tetrachloroethylene, 1,2,4-trichlorobenzene, 1,1,1-trichloroethane, 1,1,2-trichloroethane, trichloroethylene, toluene, vinyl chloride, xylenes, natural gases, such as oxygen, nitrogen, carbon dioxide, chlorine, bromine, fluorine, and hydrogen, other volatile organic compounds (VOCs), such as formic acid, ethyl hydrazine, methyl methacrylate, butyl ethyl amine, butanol, propanol, acetaldehyde, acetonitrile, butyl amine, ethyl amine, ethanol, methanol, acetone, allyl amine, allyl alcohol, methyl acetate, ammonium hydroxide, and ammonia, and the like.

In further embodiments of the invention, the outer section of the degasser can also provide for effective thermal insulation of the inner section of the degasser volume, so as to maintain the temperature of the incoming water near the boiling point of water. In some embodiments, the particles themselves are selected for their heat retaining ability. This can save energy and creates a more efficient degassing system.

In some embodiments, the degasser design of the present invention provides for a steady path to carry the degassed water into the evaporation chamber, while at the same time avoiding the need for excessive evolution of steam. This is because the steam heats the outer shell of the degasser and because it can readily enter the degasser in one zone, while a separate zone allows for the condensation and flow of degassed water out of the system. By preventing excess steam evolution, the problem of possible precipitation of salts into the particles can be avoided.

In some embodiments, the degasser can be more compact than currently used models, because the different particle sizes of the system can result in a high surface area. The height of the degasser can then be minimized, thus yielding a more compact design.

In some embodiments, the degasser is more efficient in removing impurities from a sample, as compared with conventional degassers. For example, in some embodiments, the degasser in FIG. 8 can remove 40 parts per million of chlorine from water at flow rates of up to 30 ml/minute. In some embodiments is can remove up to 2 ppm of ammonia in water at rates of up to 20 ml/minute. In some embodiments, it can remove common gases, such as air, up to their solubility limits, at rates of up to 30 ml/minute.

DEGASSER EXAMPLES

Example 3

Preparation of the Degasser Apparatus

A 1" wide by 12" tall stainless steel cylinder is fitted with a stainless steel water inlet port and a stainless steel gas/water outlet port, as shown in FIG. 8 (in alternative embodiments, a 1" wide by 8" tall, 1.5" wide by 8" tall, or 3.5" wide by 12" tall device can be used). The unit is attached to the top of an evaporation chamber apparatus. The cylinder is then filled with clean, spherical glass beads as follows. The outer region is packed with glass beads having a diameter of about 8 mm. The middle layer is then packed with beads having a diameter of about 6 mm. The central region is then packed with glass beads having a diameter of about 4 mm. The degasser is fitted with a stainless steel cover unit. The evaporation chamber is heated and steam is allowed to pass through the degasser. Once the degasser is warmed, water to be treated is preheated and then added to the top of the degasser. Water that leaves the degasser will have a reduced amount of volatile compound in it. When the device comes up to a stable temperature, it nearly completely removes gases from water containing the following concentrations: 40 ppm chlorine, 2 ppm ammonia, and most natural gases in air up to their solubility limits.

Example 4

Use of the Scale-Up Degasser Apparatus to Purify Drinking Water

The degasser apparatus of Example 3 is assembled on top of a 2 gallon evaporation chamber system. Water to be purified is then is pumped through the inlet of a preheated degasser at a rate of 5 ml/minute to 50 ml/minute. (In other embodiments, up to several liters/minute can be used). The water entering the degasser is preheated to a temperature of about 200° C. Water enters the degasser essentially at the boiling point of water. When large volumes of water are being processed, the temperature at the top of the degasser can drop a few degrees (down to 98° C.). Approximately 10 to 20% of the incoming water throughput is used as steam to drive the degasser, and about half of that is re-condensed in the degasser (although steam use can be reduced to less than 1% of the water throughput). The purified water descends into the evaporation chamber, is allowed to cool, and is sampled for levels of volatile contaminants. By use of this method, the volatile contaminants are removed, and the water is purified.

The unit can be operated continuously, so it can operate as long as there is a need to degas the water. The rate of drainage from the degasser depends on the packing and size of glass beads and varies from about one second to a few minutes.

In some embodiments, the system for purifying water, embodiments of which are disclosed herein, can be combined with other systems and devices to provide further beneficial features. For example, the system can be used in conjunction with any of the devices or methods disclosed in U.S. Provisional Patent Application No. 60/676,870 entitled, SOLAR ALIGNMENT DEVICE, filed May 2, 2005; U.S. Provisional Patent Application No. 60/697,104 entitled, VISUAL WATER FLOW INDICATOR, filed Jul. 6, 2005; U.S. Provisional Patent Application No. 60/697,106 entitled, APPARATUS FOR RESTORING THE MINERAL CONTENT OF DRINKING WATER, filed Jul. 6, 2005; U.S. Provisional Patent Application No. 60/697,107 entitled, IMPROVED CYCLONE DEMISTER, filed Jul. 6, 2005; PCT Application No: US2004/039993, filed Dec. 1, 2004; PCT Application No: US2004/039991, filed Dec. 1, 2004; and U.S. Provisional Patent Application No. 60/526,580, filed Dec. 2, 2003; each of the foregoing applications is hereby incorporated by reference in its entirety.

One skilled in the art will appreciate that these methods and devices are and may be adapted to carry out the objects and obtain the ends and advantages mentioned, as well as various other advantages and benefits. The methods, procedures, and devices described herein are presently representative of preferred embodiments and are exemplary and are not intended as limitations on the scope of the invention. Changes therein and other uses will occur to those skilled in the art which are encompassed within the spirit of the invention and are defined by the scope of the disclosure.

It will be apparent to one skilled in the art that varying substitutions and modifications can be made to the invention disclosed herein without departing from the scope and spirit of the invention.

Those skilled in the art recognize that the aspects and embodiments of the invention set forth herein can be practiced separate from each other or in conjunction with each other. Therefore, combinations of separate embodiments are within the scope of the invention as disclosed herein.

All patents and publications are herein incorporated by reference to the same extent as if each individual publication was specifically and individually indicated to be incorporated by reference.

The invention illustratively described herein suitably can be practiced in the absence of any element or elements, limitation or limitations which is not specifically disclosed herein. The terms and expressions which have been employed are used as terms of description and not of limitation, and there is no intention that in the use of such terms and expressions indicates the exclusion of equivalents of the features shown and described or portions thereof. It is recognized that various modifications are possible within the scope of the invention disclosed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the disclosure.

What is claimed is:

1. A water purification system comprising an inlet, a preheater, a degasser, an evaporation chamber, a demister, a waste condenser, a product condenser, a waste outlet, a product outlet, and a control system, wherein the degasser comprises a matrix of particles, wherein the inlet is in fluid communication with the preheater, wherein the preheater is in fluid communication with the degasser, wherein the degasser is in fluid communication with the evaporation chamber and the waste condenser, wherein the waste condenser is in fluid communication with the waste outlet, wherein the evaporation chamber is in fluid communication with the demister, wherein the demister is in fluid communication with the product condenser, wherein the product condenser is in fluid communication with the product outlet, wherein the control system permits operation of the purification system through repeated cycles without requiring user intervention or cleaning, and wherein the system is configured to remove, from a contaminated water sample, a plurality of contaminants selected from the group consisting of microbiological contaminants, radiological contaminants, metals, salts, volatile organics, and non-volatile organics, such that water purified in the system has levels of all contaminants below the levels shown in the "MCL" column of Table 1, when the contaminated water has levels of the contaminants that are up to 25 times greater than the levels shown in the "MCL" column of Table 1.

2. The system of claim 1, wherein the volume of water produced is between about 20% and about 95% of a volume of input water.

3. The system of claim 1, wherein the system does not require cleaning through at least about two months of use.

4. The system of claim 1, wherein the system does not require cleaning through at least about one year of use.

5. The system of claim 1 further comprising an inlet switch to regulate flow of water through the inlet.

6. The system of claim 5, wherein the switch comprises a mechanism selected from the group consisting of a solenoid, a valve, and an aperture.

7. The system of claim 5, wherein the inlet switch is controlled by the control system.

8. The system of claim 5, wherein the control system controls the switch based upon feedback from the purification system.

9. The system of claim 8, wherein the feedback is based upon at least one characteristic selected from the group consisting of amount of water in a product water container, flow of product water through the product outlet, time of water flow, time of no water flow, amount of water in the evaporation chamber, detection of a leak, evaporation chamber pressure, output water quality, pressure differential across the evaporation chamber, and movement of water across an evaporation chamber overflow weir float.

10. The system of claim 1, further comprising a shutdown control.

11. The system of claim 10, wherein the shutdown control is selected from the group consisting of a manual control, a flood control, a tank capacity control, and an evaporation chamber capacity control.

12. The system of claim 11, wherein the control system controls the inlet based upon feedback from a mechanism selected from the group consisting of an evaporation chamber float, a tank float, and a flood detector.

13. The system of claim 1 further comprising a flow controller.

14. The system of claim 13, wherein the flow controller comprises a pressure regulator.

15. The system of claim 14, wherein the pressure regulator maintains water pressure between about 0 kPa and 250 kPa.

16. The system of claim 13, wherein the flow controller maintains water flow at a rate of between 10 and 75 ml/mm.

17. The system of claim 1 further comprising a sediment trap.

18. The system of claim 1, wherein the preheater passes through the evaporation chamber.

19. The system of claim 1, wherein water exiting the preheater has a temperature of at least about 96° C.

20. The system of claim 1, wherein the preheater permits residence time of water in the preheater of at least about 15 seconds.

21. The system of claim 1, wherein the preheater comprises a coil.

22. The system of claim 21, the coil having a substantially horizontal net flow, and wherein water moving through the coil passes repeatedly through a horizontal plane.

23. The system of claim 1, wherein the preheater comprises heat exchange with a steam condenser.

24. The system of claim 23, wherein at least a portion of the preheater is coaxial with at least a portion of the steam condenser.

25. The system of claim 23, wherein the steam condenser contains waste steam.

26. The system of claim 1, wherein the degasser is in a substantially vertical orientation, having an upper end and a lower end.

27. The system of claim 26, wherein heated water from the preheater enters the degasser proximate to the upper end.

28. The system of claim 27, wherein the heated water exits the degasser proximate to the lower end.

29. The system of claim 26, wherein steam from the evaporation chamber enters the degasser proximate to the lower end.

30. The system of claim 29, wherein the steam exits the degasser proximate to the upper end.

31. The system of claim 1, wherein the matrix comprises substantially spherical particles.

32. The system of claim 1, wherein the matrix comprises non-spherical particles.

33. The system of claim 1, wherein the matrix comprises particles having a size selected to permit uniform packing within the degasser.

34. The system of claim 1, wherein the matrix comprises particles of distinct sizes, wherein the particles are arranged in the degasser in a size gradient.

35. The system of claim 1, wherein water exiting the degasser is substantially free of organics and volatile gasses.

36. The system of claim 1, wherein the evaporation chamber comprises at least an upper segment and a lower segment, and wherein a horizontal section of the upper segment has a greater area than a horizontal section of the lower segment, and wherein the evaporation chamber further comprises a junction between the upper segment and the lower segment.

37. The system of claim 36, wherein the junction is substantially horizontal.

38. The system of claim 36, wherein the evaporation chamber further comprises a drain, and wherein the drain is at or above the junction.

39. The system of claim 38, the evaporation chamber further comprising a self cleaning medium comprising a plurality of particles, the drain having an opening, the opening having a size that does not permit the particles to pass through the drain, the opening further having a shape that is not complementary to a shape of the particles.

40. The system of claim 1, wherein the evaporation chamber comprises a self cleaning medium for interfering with accumulation of precipitates at least in an area proximate to a heated region of the evaporation chamber.

41. The system of claim 40, wherein the medium comprises a plurality of particles.

42. The system of claim 41, wherein the particles are substantially spherical.

43. The system of claim 41, wherein the particles comprise a characteristic permitting substantially continuous agitation of the particles by boiling of water in the evaporation chamber.

44. The system of claim 43, wherein the characteristic is selected from the group consisting of specific gravity, size, morphology, population number and composition.

45. The system of claim 41, the particles having a selected hardness, wherein the hardness permits scouring of the evaporation chamber by the particles without substantially eroding the particles or the evaporation chamber.

46. The system of claim 41, wherein the particles are composed of ceramic, metal, glass, or stone.

47. The system of claim 41, the particles having a specific gravity greater than about 1.0 and less than about 8.0.

48. The system of claim 47, the particles having a specific gravity between about 2.0 and about 5.0.

49. The system of claim 1, the evaporation chamber further comprising a heating element adjacent a bottom portion of the evaporation chamber.

50. The system of claim 49, wherein the heating element is positioned outside the evaporation chamber adjacent the bottom of the evaporation chamber, and wherein the heating element is bonded to the evaporation chamber.

51. The system of claim 49, wherein the heating element is positioned inside the evaporation chamber adjacent the bottom of the evaporation chamber.

52. The system of claim 1, wherein the demister is positioned proximate to an upper surface of the evaporation chamber.

53. The system of claim 1, wherein steam from the evaporation chamber enters the demister under pressure.

54. The system of claim 1, the demister comprising a pressure differential, wherein the pressure differential is no less than 125 to 2500 Pa.

55. The system of claim 1 wherein the demister is configured to separate clean steam from waste steam via cyclonic action.

56. The system of claim 55, wherein a ratio of clean steam to waste steam is greater than about 10:1.

57. The system of claim 55, wherein the control system adjusts a parameter to regulate a steam quality.

58. The system of claim 57, wherein the steam quality comprises at least one quality selected from the group consisting of clean steam purity, ratio of clean steam to waste steam, and total volume of clean steam.

59. The system of claim 57, wherein the parameter comprises at least one parameter selected from the group consisting of a recess position of a clean steam outlet, a pressure differential across the demister, a resistance to flow of a steam inlet, and a resistance to flow of a steam outlet.

60. The system of claim 1, comprising a cooler for the product condenser.

61. The system of claim 60, wherein the cooler comprises a fan.

62. The system of claim 1, wherein the product condenser comprises a coil.

63. The system of claim 1, wherein product water exits the product condenser through the product outlet.

64. The system of claim 1, wherein waste water exits the waste condenser through the waste outlet.

65. The system of claim 1, further comprising a product water storage tank.

66. The system of claim 65 wherein the storage tank comprises at least one control mechanism.

67. The system of claim 66, wherein the control mechanism comprises at least one mechanism selected from the group consisting of a float, a conductivity meter, and a weir float.

68. The system of claim 1, wherein the control system comprises a delay such that upon initiation of a cycle, no steam is directed to the product outlet during a selected delay period.

69. The system of claim 68, wherein the delay period is at least about 10 to 30 minutes.

70. The system of claim 1, wherein the control system comprises an average residence time of water in the evaporation chamber of at least about 10 minutes.

71. The system of claim 1, wherein the control system comprises an average residence time of water in the evaporation chamber of at least about 45 minutes.

72. The system of claim 1, wherein the control system comprises an evaporation chamber flush such that water in the evaporation chamber is rapidly drained to waste, permitting removal of accumulated impurities and precipitates from the evaporation chamber.

73. The system of claim 72, wherein the evaporation chamber is configured such that upon evaporation chamber flush, a residual volume of water remains in a lower portion of the evaporation chamber.

74. The system of claim 73, wherein the residual water provides initial steam to the degasser during initiation of a subsequent purification cycle.

* * * * *